(12) United States Patent
Nomura et al.

(10) Patent No.: US 7,574,123 B2
(45) Date of Patent: Aug. 11, 2009

(54) OPTICAL IMAGE STABILIZER

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 367 days.

(21) Appl. No.: 11/477,499

(22) Filed: Jun. 30, 2006

(65) Prior Publication Data
US 2007/0003265 A1    Jan. 4, 2007

(30) Foreign Application Priority Data

| Jun. 30, 2005 | (JP) | ............................. 2005-192554 |
| Oct. 7, 2005 | (JP) | ............................. 2005-295655 |
| Jan. 31, 2006 | (JP) | ............................. 2006-022349 |

(51) Int. Cl.
*G03B 17/00* (2006.01)
*G03B 3/10* (2006.01)
*G03B 13/34* (2006.01)
*H04N 5/228* (2006.01)
*G02B 27/64* (2006.01)

(52) U.S. Cl. ............................. 396/55; 396/75; 396/133; 348/208.4; 348/208.99; 359/554

(58) Field of Classification Search .................... 396/52, 396/55, 75, 542, 133; 348/340, 208.7, 375, 348/208.4, 208.99; 359/811, 813, 557, 554, 359/368; 250/201.2
See application file for complete search history.

(56) References Cited

U.S. PATENT DOCUMENTS

| 4,711,548 | A |  | 12/1987 | Arakawa et al. ............. 354/485 |
| 5,172,276 | A | * | 12/1992 | Ueyama et al. .............. 359/813 |
| 5,416,558 | A |  | 5/1995 | Katayama et al. ............ 354/446 |
| 5,614,974 | A |  | 3/1997 | Soshi et al. .................... 396/55 |
| 5,680,251 | A | * | 10/1997 | Kato et al. ................... 359/557 |

(Continued)

FOREIGN PATENT DOCUMENTS

GB    2404810    2/2005

(Continued)

OTHER PUBLICATIONS

U.S. Appl. No. 11/477,417, filed Jun. 30, 2006, Nomura et al.

(Continued)

*Primary Examiner*—Melissa J Koval
(74) *Attorney, Agent, or Firm*—Greenblum & Bernstein P.L.C.

(57) ABSTRACT

An image stabilizer includes a first moving stage supported by a stationary member movable in a first direction in a plane orthogonal to an optical axis; a second moving stage holding an image-stabilizing optical element and supported by the first moving member to be movable in a second direction substantially orthogonal to the first direction; and first and second driving devices which are supported by the stationary member and drive the first and second moving stages in the first and second directions, respectively. The second driving device includes a moving element which is moved in the second direction, and a linkage portion which associatively links the second moving stage and the moving element to each other in a manner to allow the second moving stage and the moving element to move relative to each other in the first direction.

25 Claims, 27 Drawing Sheets

U.S. PATENT DOCUMENTS

| | | | |
|---|---|---|---|
| 5,734,931 A * | 3/1998 | Inoue et al. | 396/52 |
| 5,745,800 A * | 4/1998 | Kanbara et al. | 396/55 |
| 5,845,157 A | 12/1998 | Imura et al. | 396/55 |
| 5,883,742 A | 3/1999 | Kamata | 359/557 |
| 6,031,998 A | 2/2000 | Shono | 396/75 |
| 6,225,613 B1 | 5/2001 | Tsukamoto et al. | 250/201.2 |
| 6,366,323 B1 | 4/2002 | Shono | 348/340 |
| 6,978,089 B2 | 12/2005 | Nomura et al. | 396/75 |
| 7,319,815 B2 * | 1/2008 | Seo | 396/55 |
| 2001/0030814 A1 | 10/2001 | Koyama et al. | 359/811 |
| 2003/0067544 A1 | 4/2003 | Wada | 348/208.7 |
| 2005/0052570 A1 | 3/2005 | Enomoto | 348/375 |
| 2007/0236577 A1 * | 10/2007 | Ke et al. | 348/208.99 |

FOREIGN PATENT DOCUMENTS

| | | |
|---|---|---|
| GB | 2420927 | 6/2006 |
| JP | 6-046314 | 2/1994 |
| JP | 7-028114 | 1/1995 |
| JP | 7-294989 | 11/1995 |
| JP | 9-022039 | 1/1997 |
| JP | 10-339897 | 12/1998 |
| JP | 2001-285696 | 10/2001 |
| JP | 2003-110928 | 4/2003 |
| JP | 2003-111449 | 4/2003 |
| JP | 2004-048266 | 2/2004 |
| JP | 2005-250284 | 9/2005 |

OTHER PUBLICATIONS

U.S. Appl. No. 11/477,456, filed Jun. 30, 2006, Nomura et al.
U.S. Appl. No. 11/477,697, filed Jun. 30, 2006, Nomura et al.
U.S. Appl. No. 11/477,380, filed Jun. 30, 2006, Nomura et al.
U.S. Appl. No. 11/477,475, filed Jun. 30, 2006, Nomura et al.
English language Abstract of JP 7-028114.
English language Abstract of JP 9-022039.
English language Abstract of JP 10-339897.
English language Abstract of JP 2003-110928.
English language Abstract of JP 2003-111449.
English language Abstract of JP 2004-048266.
English language Abstract of JP 2005-250284.
English Language Abstract of JP 2001-285696.
English language Abstract of JP 7-294989, Nov. 10, 1995.

* cited by examiner

OPTICAL IMAGE STABILIZER

BACKGROUND OF THE INVENTION

1. Field of the Invention

The present invention relates to an optical image stabilizer, incorporated in optical equipment such as a camera or binoculars, for counteracting image shake due to vibrations such as hand shake.

2. Description of the Related Art

Image stabilizers (optical image stabilizers) for optical equipment prevent image shake from occurring on a focal plane by driving a part (image-stabilizing optical element) of an optical system relative to an optical axis thereof in accordance with the direction and the magnitude of vibration, such as hand shake, applied to the optical equipment.

Such image stabilizers may be classified into two types: a first type of image stabilizer which swings the image-stabilizing optical element about an axis positioned off the optical axis of the optical system, and a second type of image stabilizer (X and Y-axis direction moving stage type of image stabilizer) which moves the image-stabilizing optical element forward and reverse in directions orthogonal to each other (two orthogonal directions). The second type of image stabilizer has the advantage that the image-stabilizing optical element can be properly moved in two orthogonal directions so as to counteract image shake; however, the driving system for the image-stabilizing optical element tends to be heavy. Namely, a Y-axis direction moving stage movable in the Y-axis direction and a drive mechanism for this Y-axis direction moving stage are mounted on an X-axis direction moving stage movable in the X-axis direction, and accordingly, the X-axis direction moving stage tends to be large in size in a conventional image stabilizer having an X and Y-axis direction moving stage. This is true for the case where the X-axis direction moving stage and a drive mechanism therefor are mounted on the Y-axis direction moving stage.

SUMMARY OF THE INVENTION

The present invention provides an optical image stabilizer using two moving stages driven in two orthogonal directions, wherein the image stabilizer has a structure which does not cause an increase in size of the drive mechanism for either moving stage. The prevent invention further provides a highly reliable optical image stabilizer which can move the image-stabilizing optical element at high speed with stability.

According to an aspect of the present invention, an image stabilizer is provided, including a first moving stage supported by a stationary member to be freely movable in a first direction in a plane orthogonal to an optical axis; a second moving stage which holds an image-stabilizing optical element and is supported by the first moving member to be freely movable in a second direction in the plane orthogonal to the optical axis, the second direction being substantially orthogonal to the first direction; a first driving device which is supported by the stationary member and drives the first moving stage forward and reverse in the first direction; and a second driving device which is supported by the stationary member and drives the second moving stage forward and reverse in the second direction. The second driving device includes a moving element which is moved in the second direction, and a linkage portion which associatively links the second moving stage and the moving element to each other in a manner to allow the second moving stage and the moving element to move relative to each other in the first direction.

It is desirable for the linkage portion to include a transfer surface provided on one of the moving element and the second moving stage to extend in the first direction; and a movable contact member which is in contact with the transfer surface to be capable of moving thereon. The transfer surface and the movable contact member remain in contact with each other by a biasing force of a spring.

It is desirable for the movable contact member to include a roller which is supported in a manner to roll on the transfer surface when the second moving stage and the moving element move relative to each other in the first direction.

It is desirable for the spring to be installed between the second moving stage and the first moving stage.

It is desirable for the spring to be an extension spring which is extended so as to be installed between the second moving stage and the first moving stage.

It is desirable for the spring to be installed between the second moving stage and the stationary member.

It is desirable for the spring to be an extension spring which is extended so as to be installed between the second moving stage and the stationary member.

It is desirable for the image stabilizer to include at least one intermediate moving element which is driven by the first driving device to transfer a driving force of the first driving device to the first moving stage, wherein the intermediate moving element and the first moving stage include at least one first contacting surface and at least one second contacting surface, respectively, each of which extends in the second direction and which are made to be in contact with each other by an intermediate moving element biasing spring, the first contacting surface and the second contacting surface being capable of being disengaged from each other against a biasing force of the intermediate moving element biasing spring.

It is desirable for the intermediate moving element biasing spring to include an extension spring.

It is desirable for the first driving device to include a first feed screw and a first drive nut which is screw-engaged with the first feed screw to be prevented from rotating, and a driving force of the first driving device is transferred to the first moving stage via the first drive nut.

It is desirable for the second driving device to include a second feed screw and a second drive nut which is screw-engaged with the second feed screw to be prevented from rotating relative to the stationary member, and a driving force of the second driving device is transferred to the second moving stage via the second drive nut.

It is desirable for the first moving stage to be guided in the first direction by a pair of first guide members to be freely slidable thereon, the pair of first guide members being mounted to the stationary member. The linkage portion is positioned between one of the pair of first guide members and an imaginary straight-line segment which extends in the first direction and passes through the image-stabilizing optical element.

It is desirable for at least a part of the pair of first guide members and at least a part of the linkage portion to be positioned in a common plane orthogonal to the optical axis.

It is desirable for the pair of first guide members to be a pair of parallel guide shafts.

It is desirable for the second moving stage to be guided in the second direction by a pair of second guide members to be freely slidable thereon, the pair of second guide members being mounted to the first moving stage. The linkage portion and the spring are positioned on one common side of the pair of second guide members.

It is desirable for the pair of second guide members to include a pair of parallel guide shafts.

It is desirable for at least a part of the pair of second guide members, at least a part of the linkage portion and at least a part of the spring to be positioned in a common plane orthogonal to the optical axis.

It is desirable for each of the first driving device and the second driving device to include a motor.

It is desirable for the image stabilizer to be incorporated in an imaging device, the image-stabilizing optical element including an image pickup device.

Even if attention is focused only on the support structure for supporting the X-axis direction moving stage that supports the image-stabilizing optical element, the image stabilizer according to the present invention still has distinctive features.

Namely, in an embodiment, an image stabilizer is provided, including an X-axis direction moving stage on which an image-stabilizing optical element is mounted; an X-axis direction guide device which supports the X-axis direction moving stage in a manner to allow the X-axis direction moving stage to freely move linearly in an X-axis direction in a plane orthogonal to an optical axis; an X-axis direction moving device having a first contacting portion contactable with a second contacting portion provided on the X-axis direction moving stage; and a biasing member which biases the X-axis direction moving stage in a direction to make the first contacting portion and the second contacting portion remain in contact with each other. The X-axis direction guide device, the first contacting portion, the second contacting portion and the biasing member lie in a common plane.

According to such a support structure, in the case where the X-axis direction moving stage is supported by the Y-axis direction moving stage thereon which is supported to be freely movable in the Y-axis direction orthogonal to the X-axis direction in a plane orthogonal to the optical axis, a stable support structure is achieved for the image-stabilizing optical element which prevents undesirable moments of force such as bending and torsion which may be caused by movements of the X-axis direction moving stage in the X-axis direction from acting on the Y-axis direction moving stage.

It is desirable for the image stabilizer to include a Y-axis direction moving stage which is supported to be freely movable in a Y-axis direction in the plane orthogonal to the optical axis, the Y-axis direction being orthogonal to the X-axis direction, wherein the X-axis direction moving stage is supported by the Y-axis direction moving stage to be freely movable in the X-axis direction.

It is desirable for the first contacting portion and the second contacting portion to move relative to each other when the Y-axis direction moving stage moves in the Y-axis direction.

It is desirable for the biasing device to be a coil spring, wherein one and the other ends of the coil spring are connected to the X-axis direction moving stage and a stationary member, respectively.

It is desirable for the biasing device to be a coil spring, wherein one and the other ends of the coil spring are connected to the X-axis direction moving stage and the Y-axis direction moving stage, respectively.

It is desirable for one and the other of the first contacting portion and the second contacting portion to include a transfer surface and a roller, respectively. The transfer surface is formed as a flat surface extending in the Y-axis direction and is orthogonal to the X-axis direction. The roller is supported in a manner to roll on the transfer surface when the roller moves relative to the transfer surface thereon.

It is desirable for the biasing member to be an extension spring.

It is desirable for the X-axis direction guide device to include a pair of parallel guide shafts.

It is desirable for the image stabilizer to be incorporated in an imaging device, the image-stabilizing optical element including an image pickup device.

Note that although the above-described structure refers to an "X-axis direction moving stage" and a "Y-axis direction moving stage", the terms "X-axis direction" and "Y-axis direction" thereof are not limited to any specific direction.

The present disclosure relates to subject matter contained in Japanese Patent Applications Nos. 2005-192554 (filed on Jun. 30, 2005), 2005-295655 (filed on Oct. 7, 2005) and 2006-22349 (filed on Jan. 31, 2006), which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
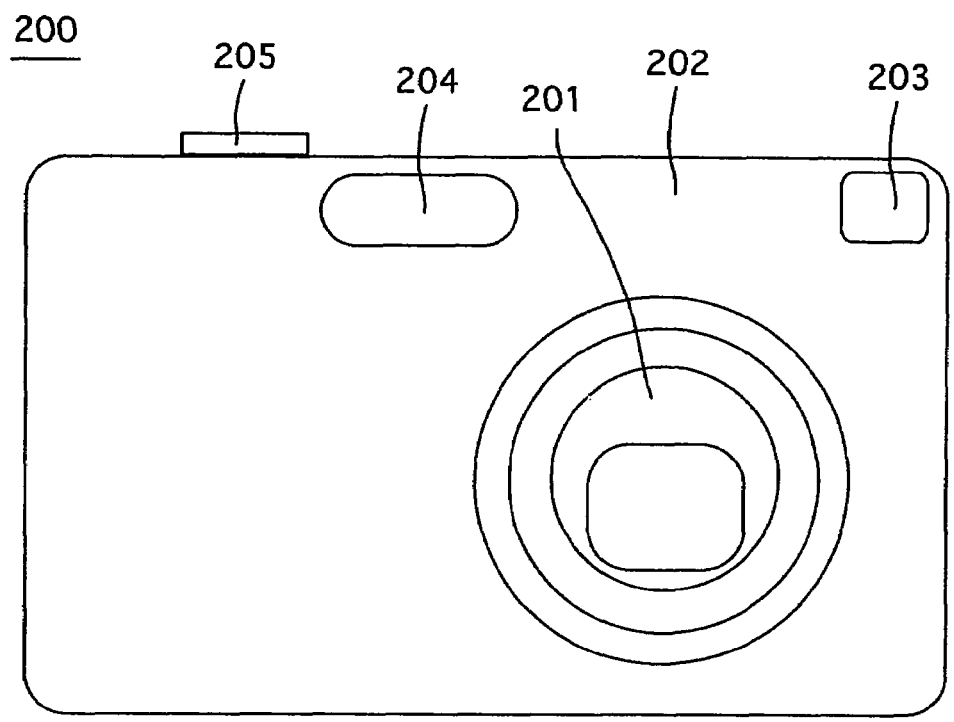
FIG. 1 is a front elevational view of an embodiment of a digital camera incorporating an image stabilizer according to the present invention.

FIG. 1 shows an outward appearance of a digital camera 200 which incorporates an image stabilizer according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
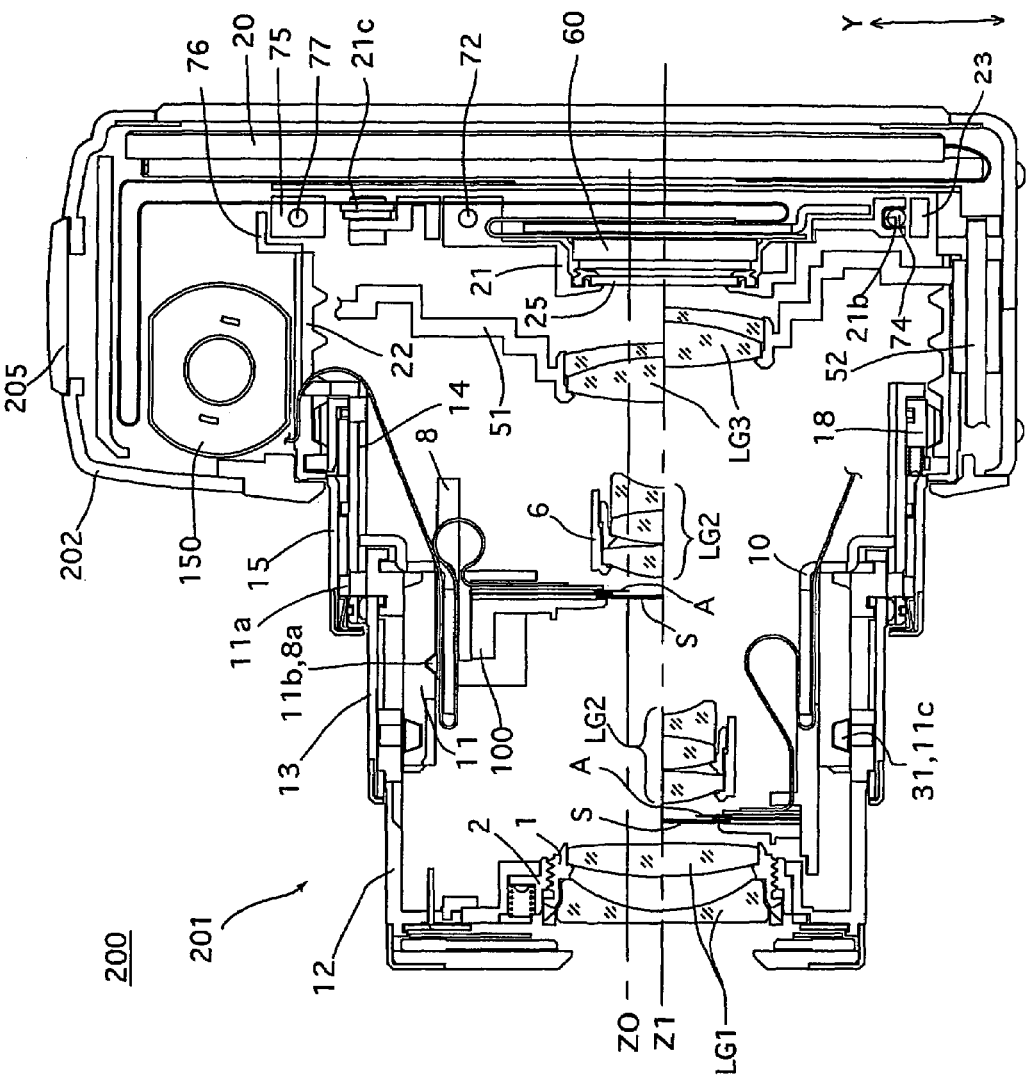
FIG. 2 is a longitudinal sectional view of the digital camera shown in FIG. 1 in a ready-to-photograph state of the zoom lens thereof.
Figure 3:
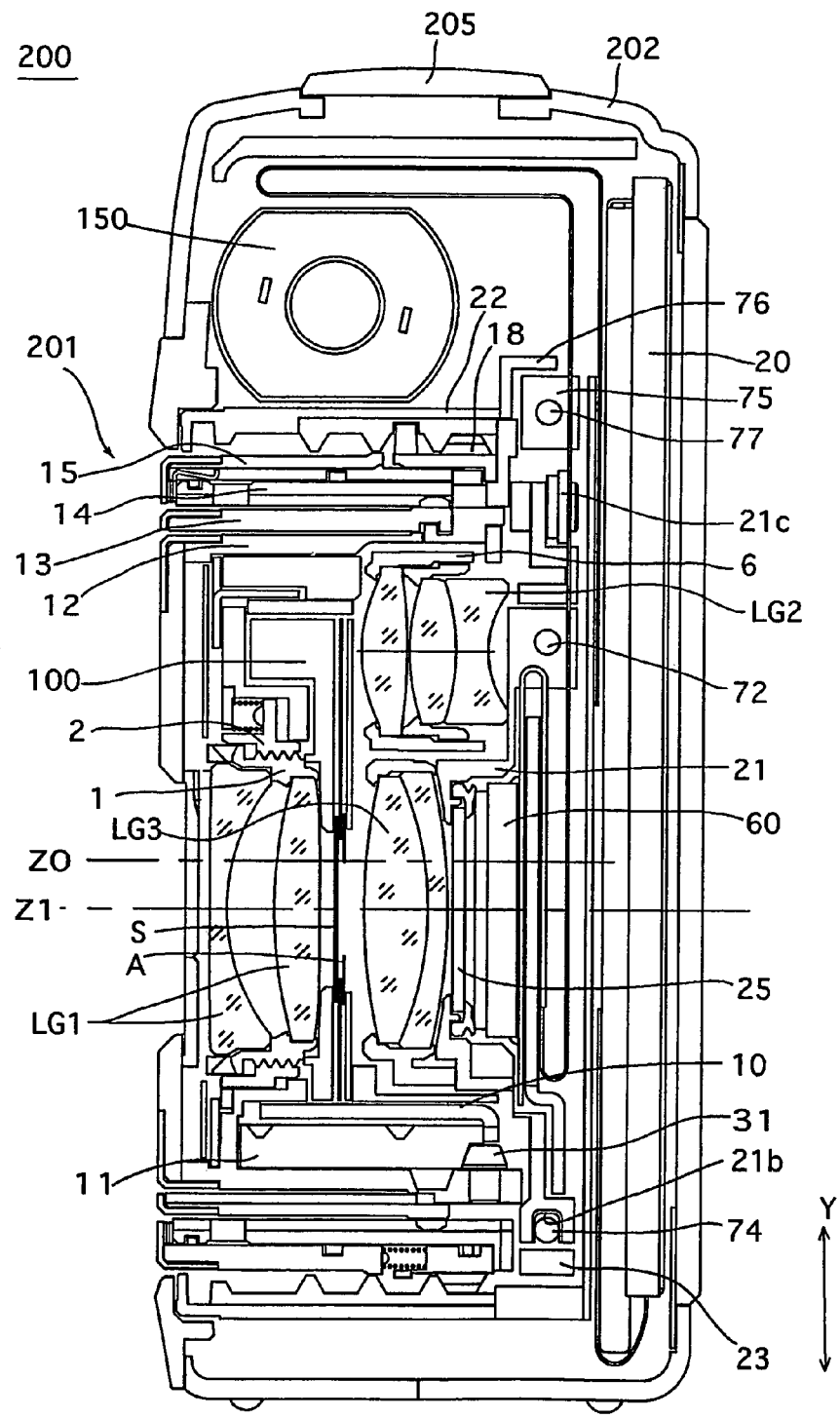
FIG. 3 is a longitudinal sectional view of the digital camera shown in FIG. 1 in the fully-retracted state of the zoom lens.
Figure 5:
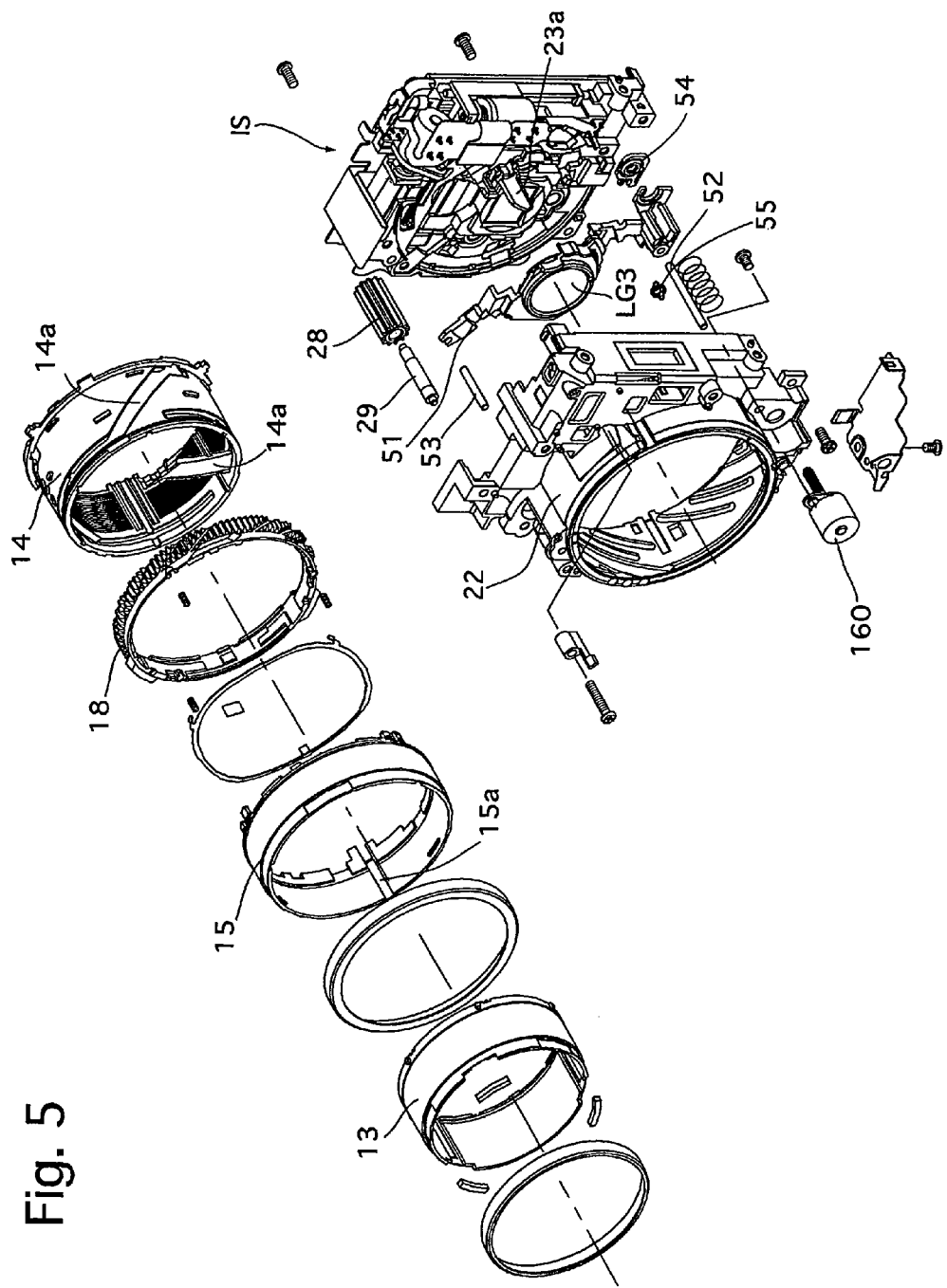
FIG. 5 is an exploded perspective view of a portion of the zoom lens shown in FIG. 4.
Figure 6:
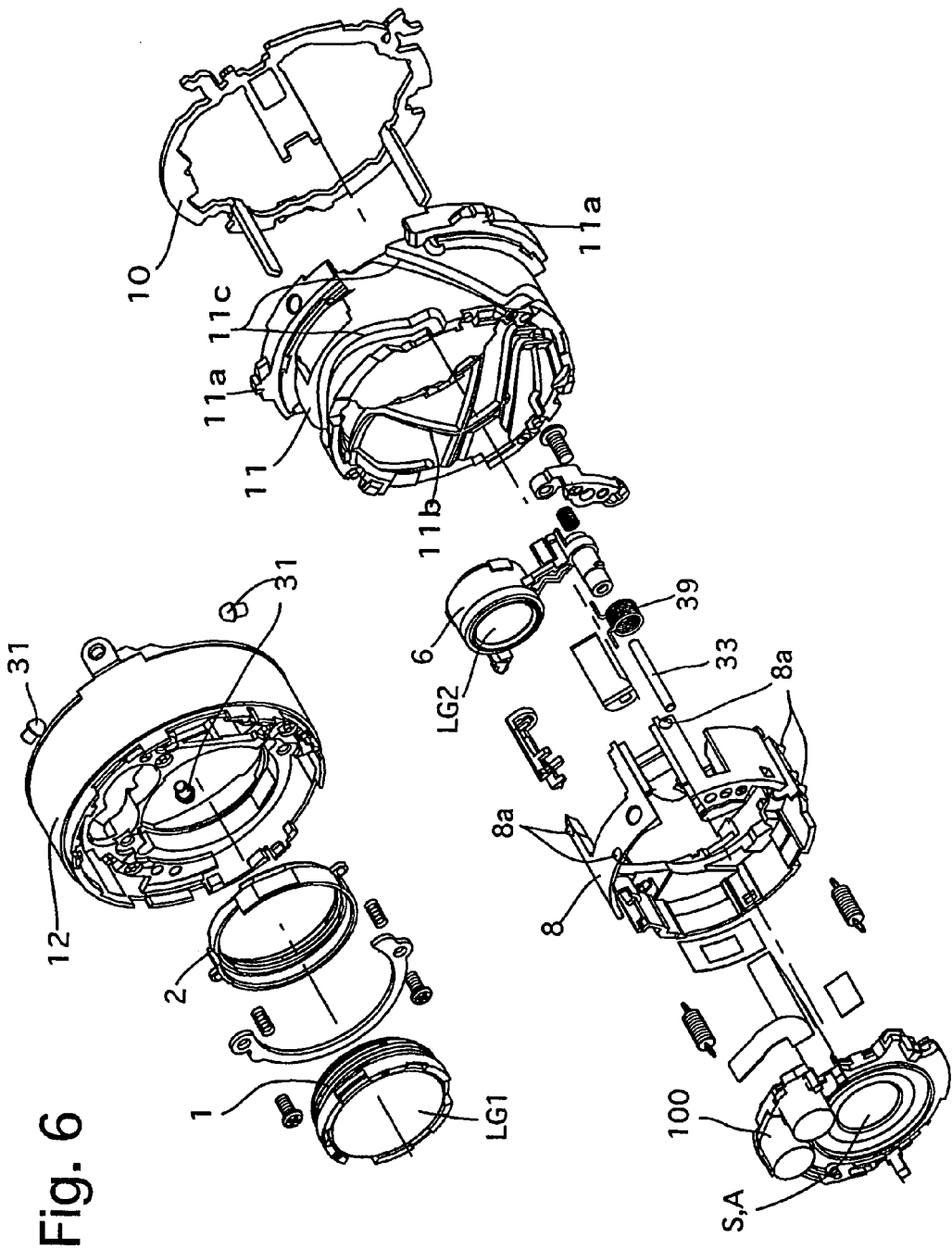
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward viewed in FIGS. 2 and 3) from the camera body 202 as shown in FIG. 2 during a photographing operation. When photography is no being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer are defined as a Y-axis direction and an X-axis direction, respectively.

The stationary barrel 22 is positioned in the camera body 202 and fixed thereto, while a stationary holder 23 is fixed to a rear portion of the stationary barrel 22. The CCD image sensor 60 and the low-pass filter 25 are supported by the stationary holder 23 via a Y-axis direction moving stage 71 and an X-axis direction moving stage 21 to be movable in the X-axis direction and the Y-axis direction. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55. The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
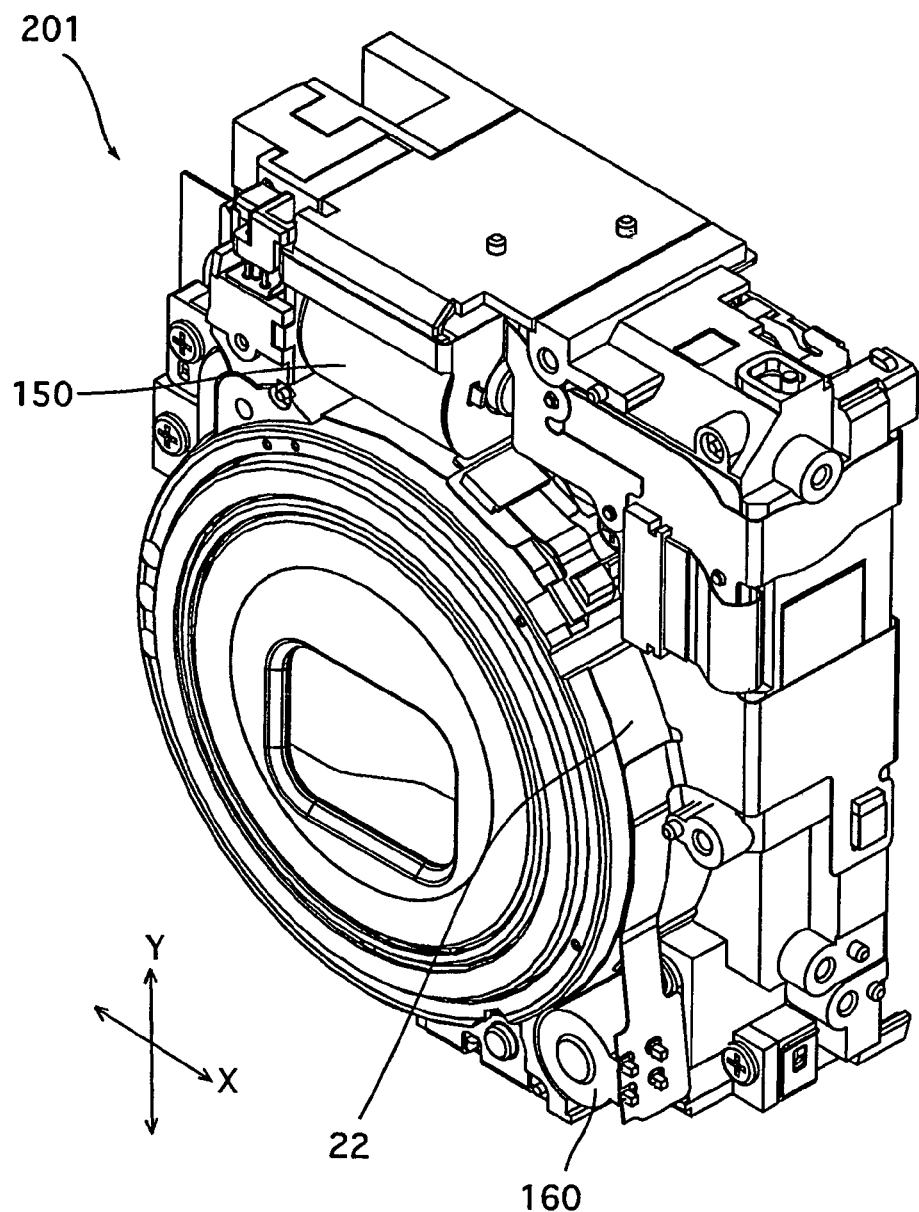
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 to the position in the state of the zoom lens 201 immediately before the zoom lens 201 is in the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined with respect to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 to the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 to extend parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar (second lens frame removing device) 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. At this time, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a and the set of three followers 11a of the cam ring 11, respectively. Once the helicoid ring 18 and the cam ring 11 advance to respective predetermined points thereof, the functions of a rotating/advancing mechanism (the aforementioned helicoid structure) between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, where the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, while an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During the course of this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
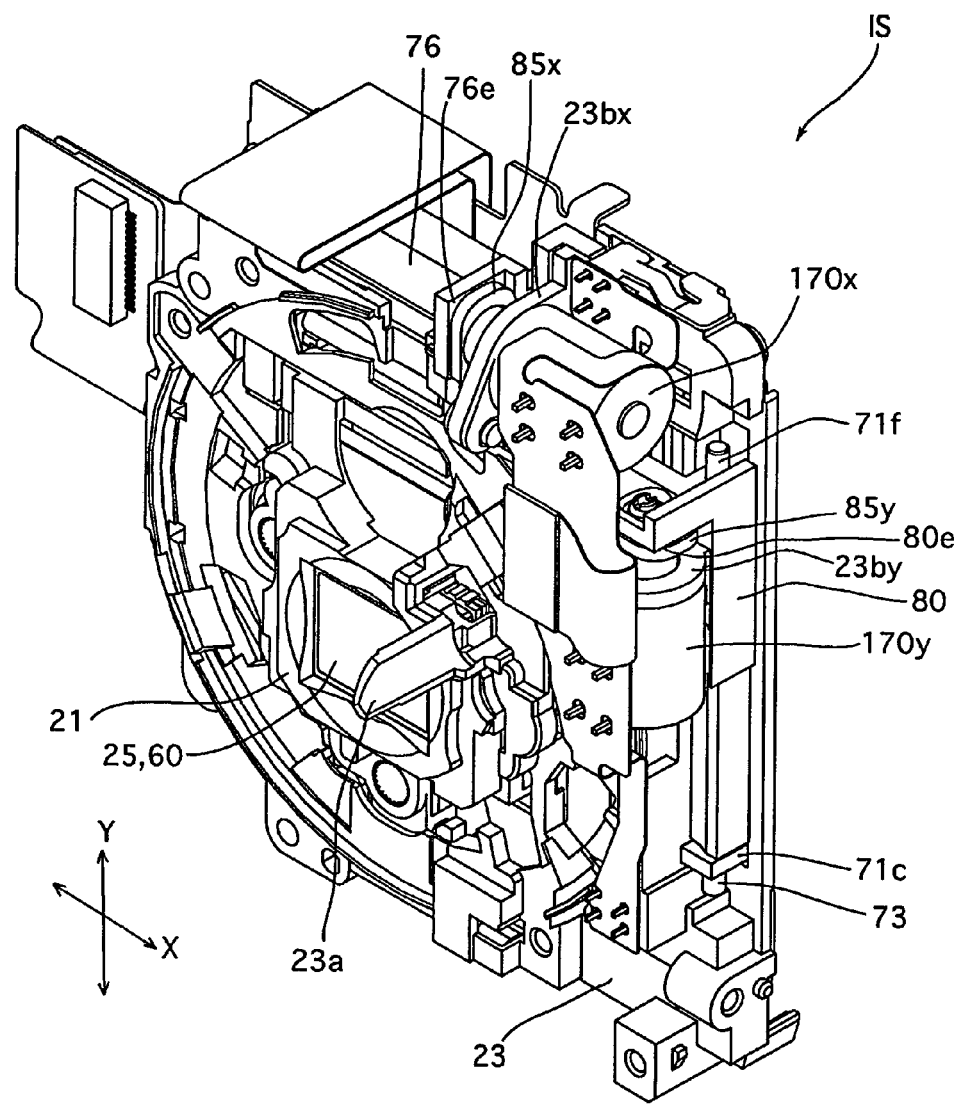
FIG. 7 is a front perspective view of an image stabilizing unit (image stabilizing mechanism) shown in FIG. 5.
Figure 8:
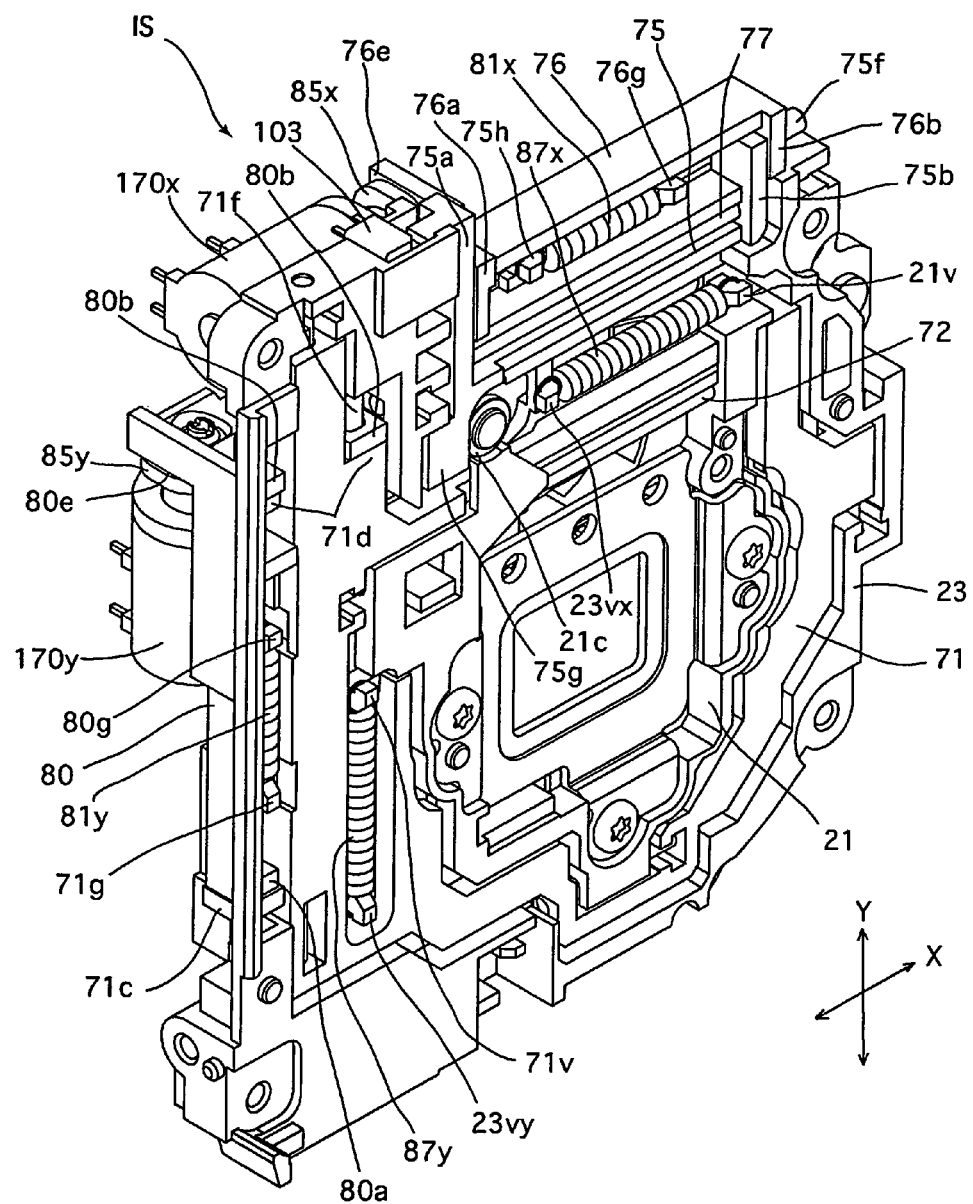
FIG. 8 is a rear perspective view of the image stabilizing unit shown in FIG. 5.
Figure 9:
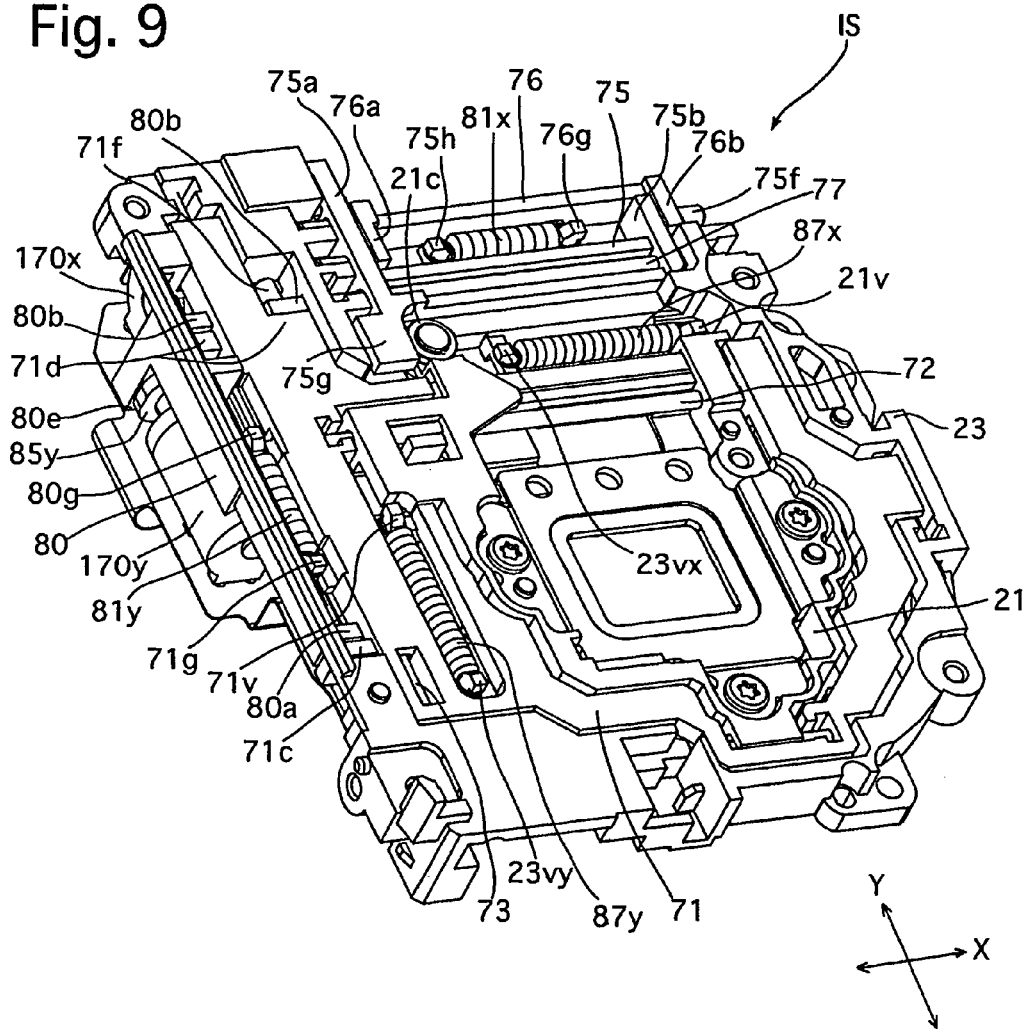
FIG. 9 is a rear perspective view of the image stabilizing unit shown in FIG. 5, viewed from an angle different from the angle of FIG. 8.
Figure 10:
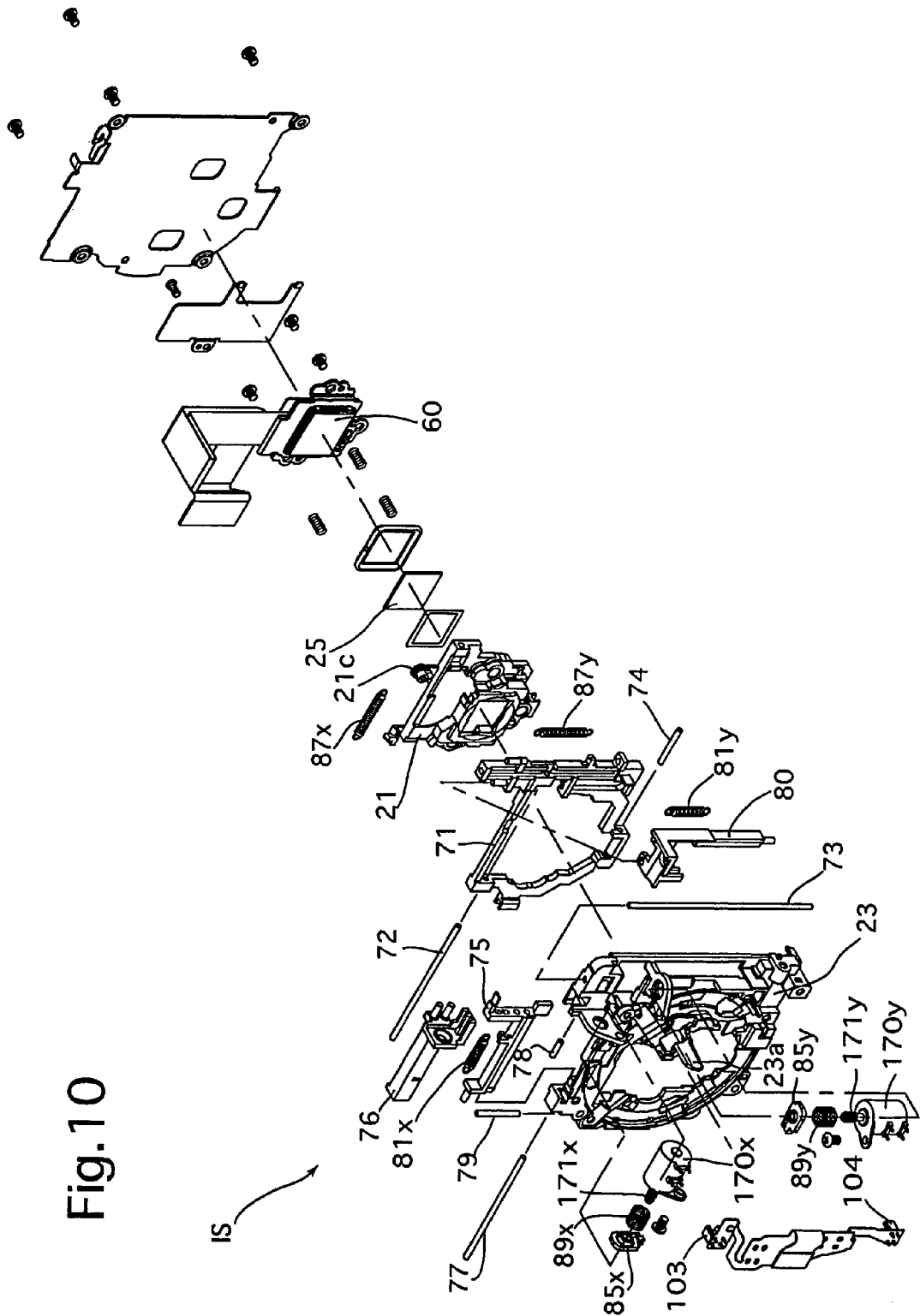
FIG. 10 is an exploded perspective view of the image stabilizing unit.
Figure 25:
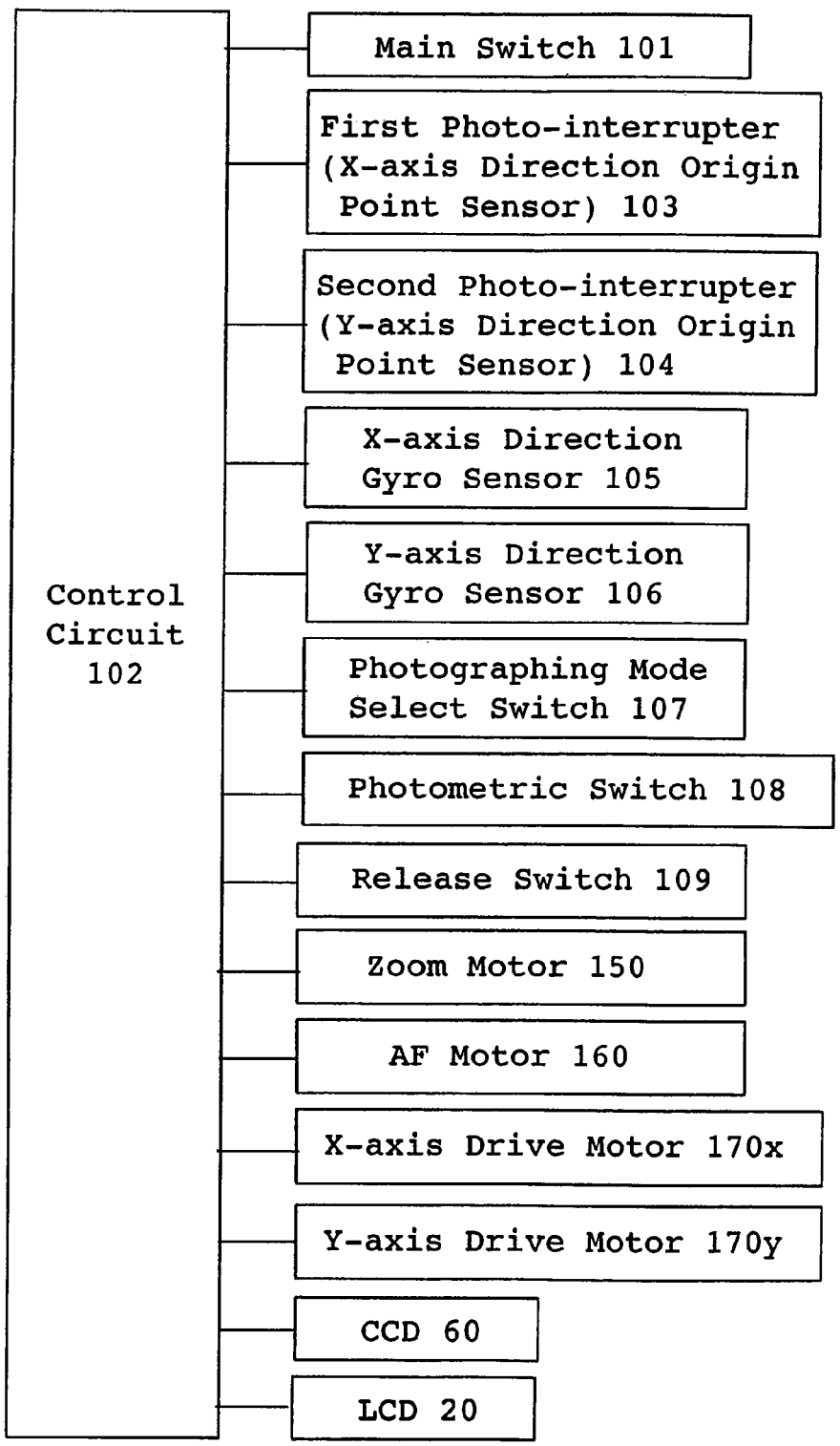
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-axis direction guide rods 73 and 79 which extend in the Y-axis direction (the vertical direction of the digital camera 200). The Y-axis direction moving stage 71 is provided with a guide hole 71a and a guide groove 71b (see FIG. 16) in which the pair of Y-axis direction guide rods 73 and 79 are engaged so that the Y-axis direction moving stage 71 is supported by the pair of Y-axis direction guide rods 73 and 79 to be freely slidable thereon, respectively. A pair of X-axis direction guide rods 72 and 74 are fixed to the Y-axis direction moving stage 71 to extend in the X-axis direction (the horizontal direction of the digital camera 200) that is perpendicular to the Y-axis direction. The X-axis direction stage 21 is provided with a guide hole 21a and a guide groove 21b (see FIGS. 12 and 13) in which the pair of X-axis direction guide rods 72 and 74 are engaged so that the X-axis direction moving stage 21 is freely slidable thereon, respectively. Accordingly, the CCD image sensor 60 is supported by the stationary holder 23 via the Y-axis direction moving stage 71 and the X-axis direction moving stage 21 to be movable in two axial directions orthogonal to each other in a plane orthogonal to the photographing optical axis Z1. The range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23.

The image stabilizing unit IS is provided with an X-axis direction stage biasing spring 87x which is extended and to be installed between a spring hook 21v formed on the X-axis direction moving stage 21 and a spring hook 23vx formed on the stationary holder 23. The X-axis direction stage biasing spring 87x is an extension coil spring and biases the X-axis direction moving stage 21 rightward as viewed from the front of the zoom lens 201 (leftward as viewed from the rear of the zoom lens 201). The image stabilizing unit IS is provided with a Y-axis direction stage biasing spring 87y which is extended and to be installed between a spring hook 71v formed on the Y-axis direction moving stage 71 and a spring hook 23vy formed on the stationary holder 23. The Y-axis direction stage biasing spring 87y is an extension coil spring and biases the Y-axis direction moving stage 71 downward. The axis of the X-axis direction stage biasing spring 87x lies in a plane in which the axes of the pair of X-axis direction guide rods 72 and 74, which serve as an X-axis direction guide device for guiding the X-axis stage 21 in the X-axis direction, lie.

Figure 16:
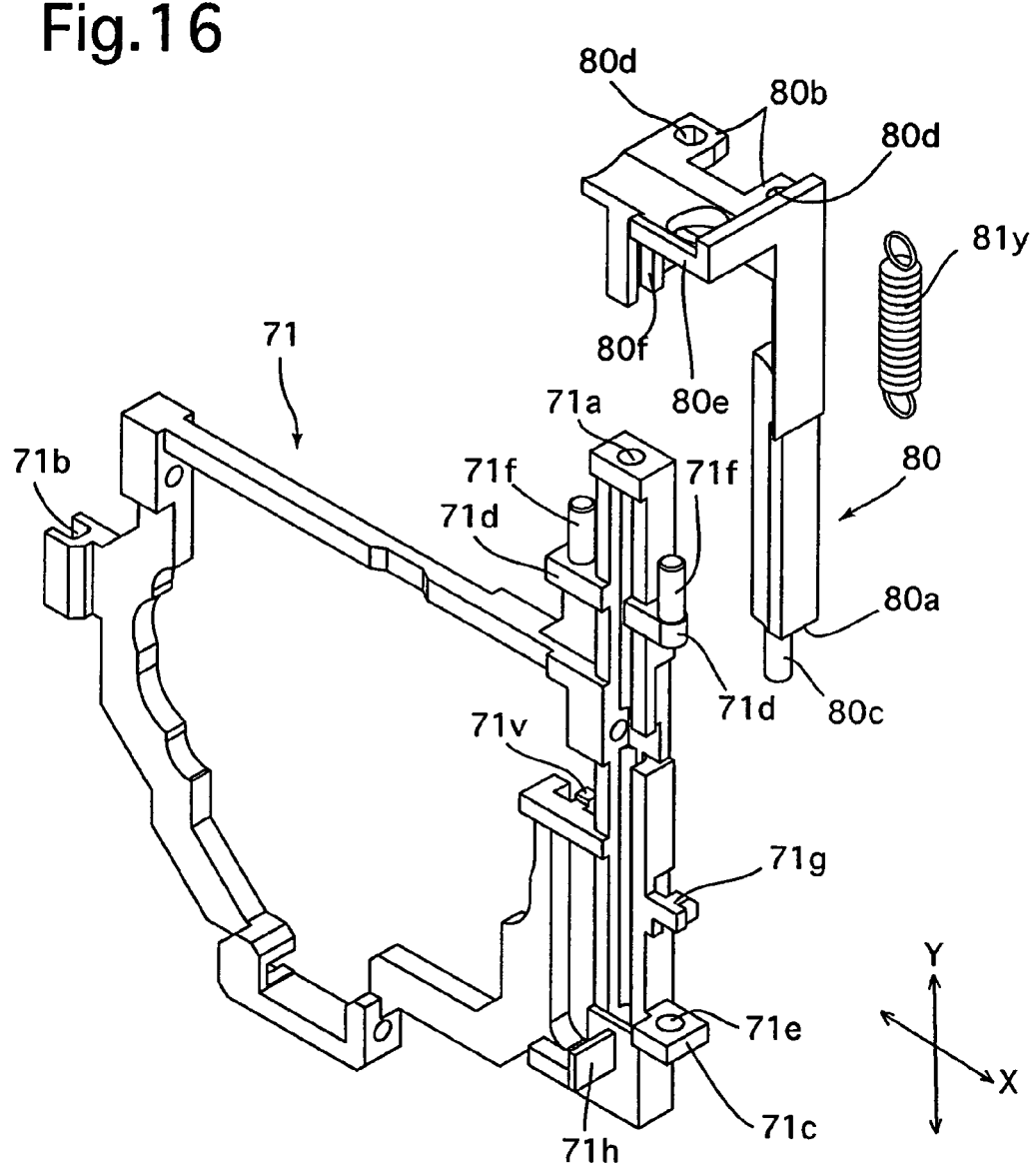
FIG. 16 is an exploded perspective view of a Y-axis direction moving member, a Y-axis direction moving stage and an associated extension joining spring of the image stabilizing unit.
Figure 17:
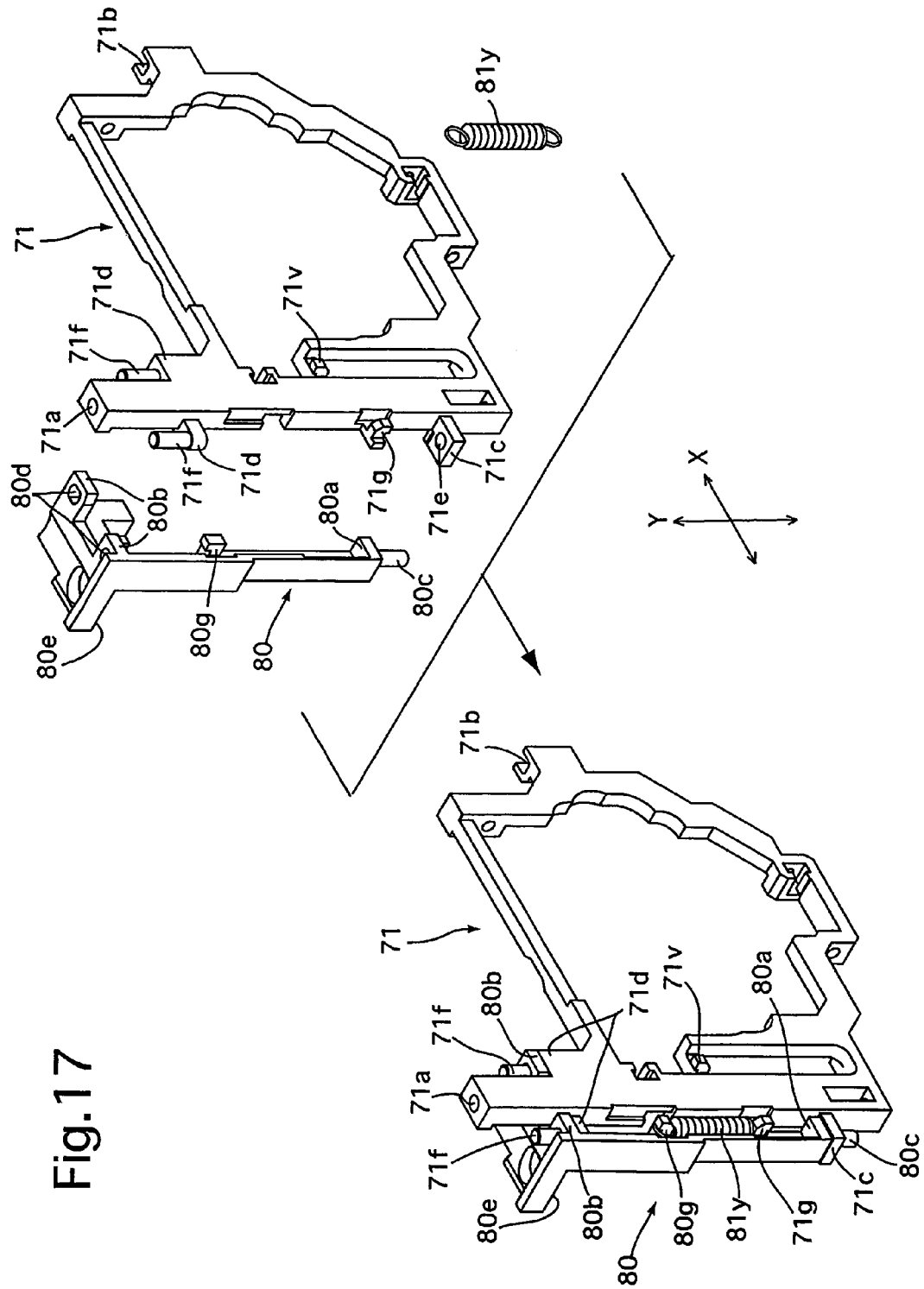
FIG. 17 is a rear perspective view of the Y-axis direction moving member, the Y-axis direction moving stage and the associated extension joining spring that are shown in FIG. 16, showing an exploded state and an assembled state thereof.

As shown in FIGS. 16 and 17, the image stabilizing unit IS is provided on one side of the Y-axis direction moving stage 71 with a Y-axis direction moving member 80 which is supported by the Y-axis direction moving stage 71. The Y-axis direction moving member 80 is elongated in the Y-axis direction and provided in the vicinity of upper and lower ends of the Y-axis direction moving member 80 with a movement limit lug 80a and a movement limit lug 80b, respectively. The Y-axis direction moving member 80 is provided at a lower end thereof with a guide pin 80c which extends downward from the movement limit lug 80a. The movement limit lug 80b is provided with a pair of guide holes 80d. The Y-axis direction moving member 80 is further provided in the vicinity of the pair of guide holes 80d with a nut contacting portion 80e and a linear groove 80f (see FIG. 16), and is further provided, on a vertically straight portion of the Y-axis direction moving member 80 between the movement limit lug 80a and the movement limit lug 80b, with a spring hook 80g (see FIG. 17). The linear groove 80f is elongated in the Y-axis direction.

The Y-axis direction moving stage 71 is provided with a movement limit lug 71c and a movement limit lug 71d which face the movement limit lug 80a and the movement limit lug 80b of the Y-axis direction moving member 80, respectively. The movement limit lug 71c is provided with a guide hole 71e in which the guide pin 80c is slidably engaged, and the movement limit lug 71d is provided with a pair of guide pins 71f which extend upward to be slidably engaged in the pair of guide holes 80d, respectively. The Y-axis direction moving stage 71 is provided on a vertically straight portion thereof between the movement limit lug 71c and a movement limit lug 71d, with a spring hook 71g.

The Y-axis direction moving stage 71 and the Y-axis direction moving member 80 are guided to be movable relative to each other in the Y-axis direction by the engagement of the guide hole 71e with the guide pin 80c and the engagement of the pair of guide pins 71f with the pair of guide holes 80d. The image stabilizing unit IS is provided with an extension joining spring 81y which is extended and installed between the spring hook 71g of the Y-axis direction moving stage 71 and the spring hook 80g of the Y-axis direction moving member 80. The extension joining spring 81y biases the Y-axis direction moving stage 71 and the Y-axis direction moving member 80 in opposite directions to bring the movement limit lug 80a and the movement limit lug 71c into contact with each other and to bring the movement limit lug 80b and the movement limit lug 71d into contact with each other, i.e., in opposite directions to move the Y-axis direction moving stage 71 and the Y-axis direction moving member 80 upward and downward, respectively.

Figure 14:
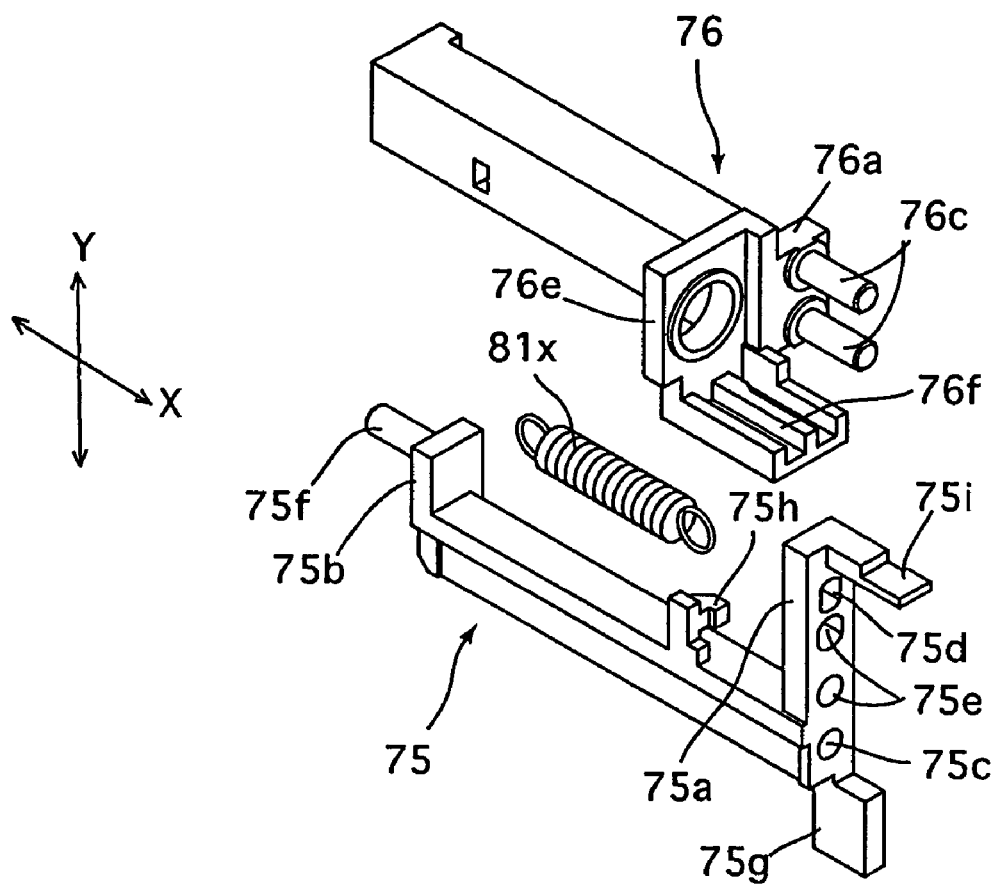
FIG. 14 is a front perspective view of a first X-axis direction moving member, a second X-axis direction moving member and an associated extension joining spring of the image stabilizing unit, showing an exploded state thereof.
Figure 15:
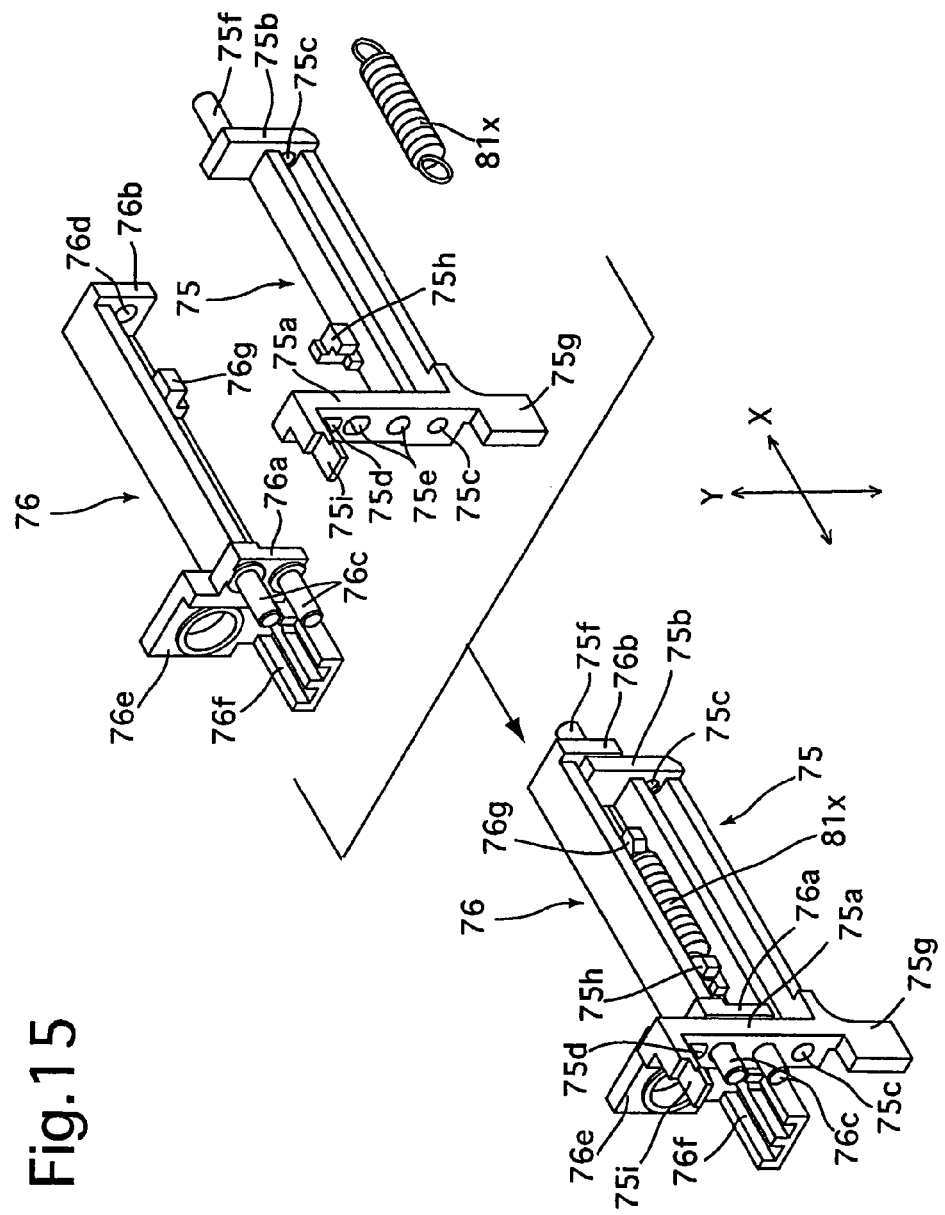
FIG. 15 is a rear perspective view of the first X-axis direction moving member, the second X-axis direction moving member and the associated extension joining spring that are shown in FIG. 14, showing an exploded state and an assembled state thereof.

Another pair of X-axis direction guide rods 77 and 78 that are different from the pair of X-axis direction guide rods 72 and 74 are fixed to the stationary holder 23 to extend in the X-axis direction. The image stabilizing unit IS is provided with a first X-axis direction moving member 75 which is supported by the stationary holder 23 via the pair of X-axis direction guide rods 77 and 78 to be freely slidable thereon. As shown in FIGS. 14 and 15, the first X-axis direction moving member 75 is elongated in the X-axis direction, and is provided, in the vicinity of opposite ends of the first X-axis direction moving member 75 in the X-axis direction, with a movement limit lug 75a and a movement limit lug 75b, respectively. A pair of guide holes 75c in which the X-axis direction guide rod 77 is inserted are formed on the movement limit lugs 75a and 75b, respectively, to be aligned in the X-axis direction. A guide hole 75d in which the X-axis direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75*b* is provided, above the associated guide hole 75*c* in the Y-axis direction (see FIG. 15), with a guide pin 75*f* which extends in the X-axis direction in a direction away from the movement limit lug 75*a*. The first X-axis direction moving member 75 is further provided at the bottom of the movement limit lug 75*a* with a linkage projection 75*g*, and is further provided, on a horizontally straight portion of the first X-axis direction moving member 75 between the movement limit lug 75*a* and a movement limit lug 75*b*, with a spring hook 75*h*.

The image stabilizing unit IS is provided on the first X-axis direction moving member 75 with a second X-axis direction moving member 76. The second X-axis direction moving member 76 is provided with a movement limit lug 76*a* and a movement limit lug 76*b* which are separate from each other in the X-axis direction. The movement limit lug 76*a* is provided with a pair of guide pins 76*c* which extend in the X-axis direction to be slidably engaged in the pair of guide holes 75*e* of the first X-axis direction moving member 75, respectively, while the movement limit lug 76*b* is provided with a guide hole 76*d* in which the guide pin 75*f* of the first X-axis direction moving member 75 is slidably engaged. The second X-axis direction moving member 76 is further provided in the vicinity of the movement limit lug 76*a* with a nut contacting portion 76*e* and a linear groove 76*f* (see FIG. 15), and is further provided, on a horizontally straight portion of the second X-axis direction moving member 76 between the movement limit lug 76*a* and the movement limit lug 76*b*, with a spring hook 76*g*. The linear groove 76*f* is elongated in the Y-axis direction.

The first X-axis direction moving member 75 and the second X-axis direction moving member 76 are guided to be movable relative to each other in the X-axis direction by the engagement of the pair of guide pins 76*c* with the pair of guide holes 75*e* and the engagement of the guide pin 75*f* with the guide hole 76*d*. The image stabilizing unit IS is provided with an extension joining spring 81*x* which is extended and to be installed between the spring hook 75*h* of the first X-axis direction moving member 75 and the spring hook 76*g* of the second X-axis direction moving member 76. The extension joining spring 81*x* biases the first X-axis direction moving member 75 and the second X-axis direction moving member 76 in opposite directions to bring the movement limit lug 75*a* and the movement limit lug 76*a* into contact with each other and to bring the movement limit lug 75*b* and the movement limit lug 76*b* into contact with each other.

The linkage projection 75*g* of the first X-axis direction moving member 75 is in contact with a transfer roller 21*c* (see FIGS. 12, 13 and 24) mounted to the X-axis direction moving stage 21 so that a moving force in the X-axis direction is transferred from the first X-axis direction moving member 75 to the X-axis direction moving stage 21 via the contacting engagement between the linkage projection 75*g* and the transfer roller 21*c*. The transfer roller 21*c* is supported by a rotation pin parallel to the photographing optical axis Z1 so as to be freely rotatable on the rotation pin. When the X-axis direction moving stage 21 moves with the Y-axis direction moving stage 71 in the Y-axis direction, the transfer roller 21*c* rolls on a contacting surface of the linkage projection 75*g*. This contacting surface of the linkage projection 75*g* is a flat surface elongated in the Y-axis direction, and accordingly, allows the transfer roller 21*c* to roll on the contacting surface of the linkage projection 75*g* makes it possible for the X-axis direction moving stage 21 to move in the Y-axis direction without exerting any driving force in the Y-axis direction to the first X-axis direction moving member 75. The transfer roller 21*c* and the aforementioned flat contacting surface (transfer surface) of the linkage projection 75*g*, on which the transfer roller 21*c* rolls, are in contact with each other in a common plane common with both the axes of the pair of X-axis direction guide rods 72 and 74 and the axis of the X-axis direction stage biasing spring 87*x*.

Figure 11:
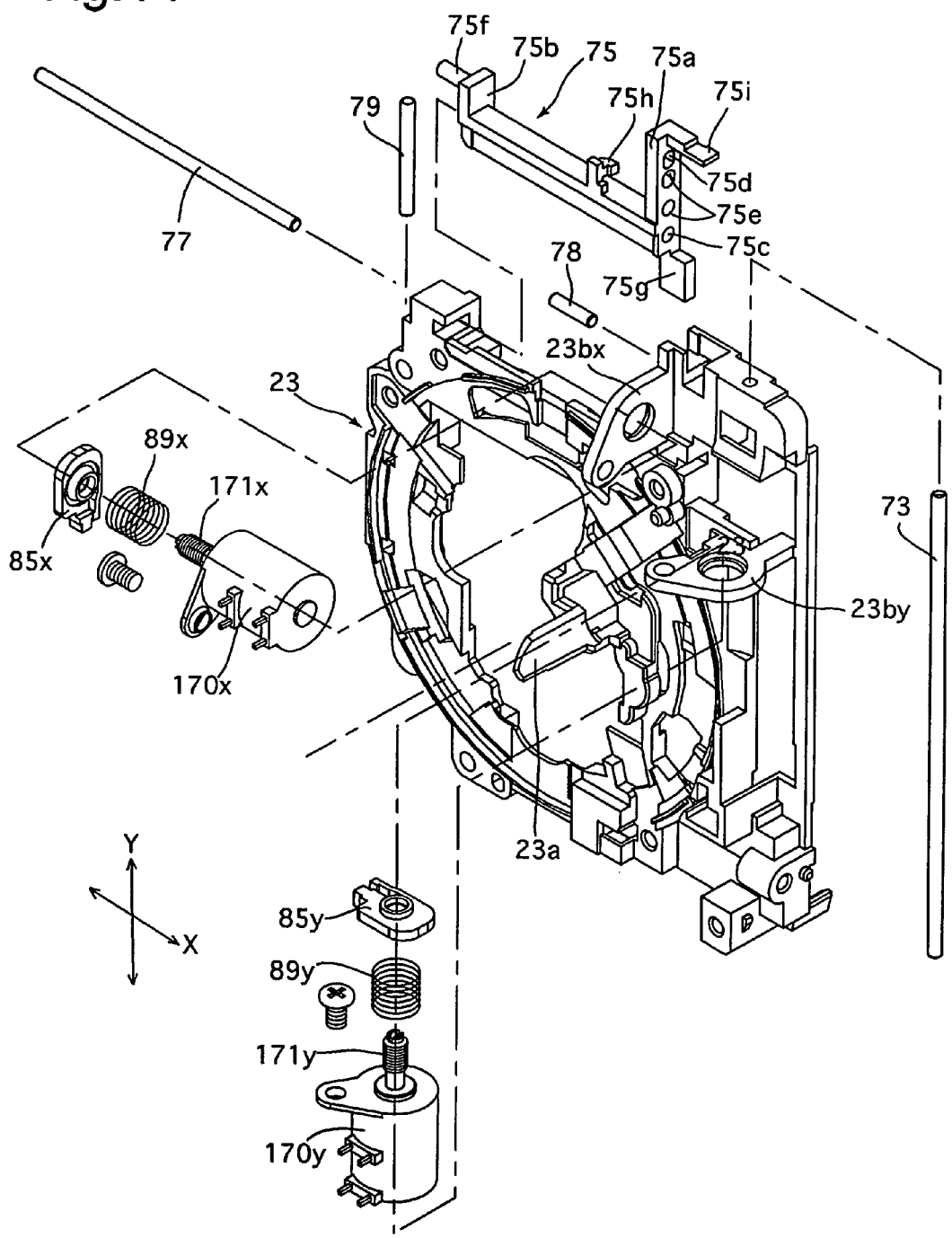
FIG. 11 is an exploded perspective view of a portion of the image stabilizing unit in the vicinity of a stationary holder thereof.
Figure 12:
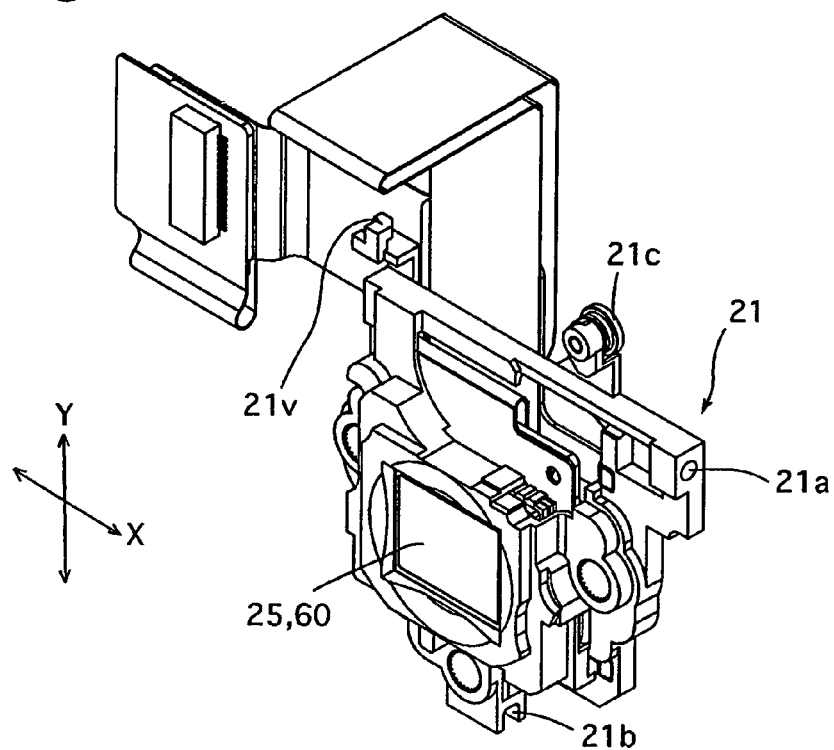
FIG. 12 is a front perspective view of an X-axis direction moving stage and associated elements shown in FIG. 10.
Figure 13:
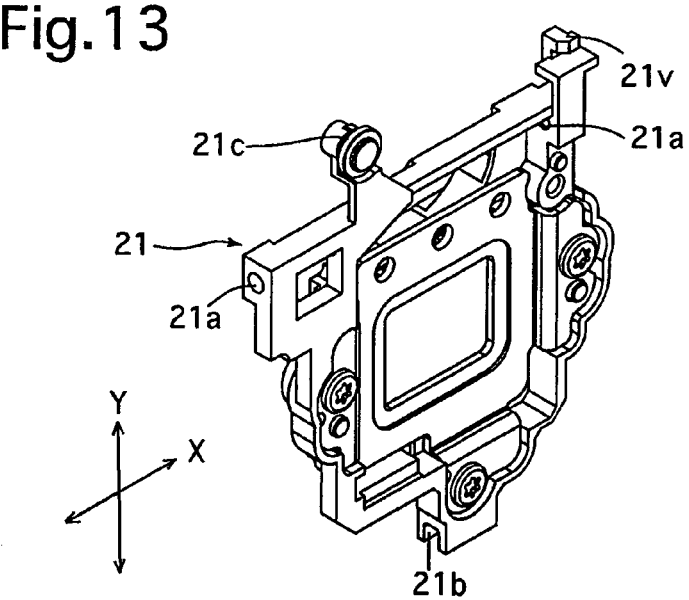
FIG. 13 is a rear perspective view of the X-axis direction moving stage shown in FIG. 12.

As shown in FIG. 11, the image stabilizing unit IS is provided with an X-axis drive motor 170*x* serving as a drive source for driving the CCD image sensor 60 in the X-axis direction and a Y-axis drive motor 170*y* serving as a drive source for driving the CCD image sensor 60 in the Y-axis direction. The X-axis drive motor 170*x* and the Y-axis drive motor 170*y* are fixed to a motor bracket 23*bx* and a motor bracket 23*by*, respectively, which are integrally formed on the stationary holder 23. Each of the X-axis drive motor 170*x* and the Y-axis drive motor 170*y* is a stepping motor. A drive shaft (rotary shaft) of the X-axis drive motor 170*x* is threaded to serve as a feed screw 171*x*, and a drive shaft (rotary shaft) of the Y-axis drive motor 170*y* is threaded to serve as a feed screw 171*y*. The feed screw 171*x* is screwed into a female screw hole of an X-axis direction driven nut member 85*x* and the feed screw 171*y* is screwed into a female screw hole of a Y-axis direction driven nut member 85*y*. The X-axis direction driven nut member 85*x* is guided linearly in the X-axis direction by the linear groove 76*f*, and is in contact with the nut contacting portion 76*e*. The Y-axis direction driven nut member 85*y* is guided linearly in the Y-axis direction by the linear groove 80*f*, and is in contact with the nut contacting portion 80*e*. The X-axis direction driven nut member 85*x* can be screw-disengaged from either end of the feed screw 171*x*, and the Y-axis direction driven nut member 85*y* can be screw-disengaged from either end of the feed screw 171*y*.

A nut-member biasing spring 89*x* is positioned between the X-axis direction driven nut member 85*x* and the X-axis drive motor 170*x*, and a nut-member biasing spring 89*y* is positioned between the Y-axis direction driven nut member 85*x* and the X-axis drive motor 170*y*. Each of the nut-member biasing springs 89*x* and 89*y* is a compression coil spring which is loosely fitted on the associated feed screw 171*x* and 171*y*, respectively, in a compressed state. The nut-member biasing spring 89*x* biases the X-axis direction driven nut member 85*x* in a direction to bring the X-axis direction driven nut member 85*x* back into screw engagement with the X-axis drive motor 170*x* in the case where the X-axis direction driven nut member 85*x* is disengaged from the X-axis drive motor 170*x* toward the X-axis drive motor 170*x* side. Likewise, the nut-member biasing spring 89*y* biases the Y-axis direction driven nut member 85*y* in a direction to bring the Y-axis direction driven nut member 85*y* back into screw engagement with the Y-axis drive motor 170*y* in the case where the Y-axis direction driven nut member 85*y* is disengaged from the Y-axis drive motor 170*y* toward the Y-axis drive motor 170*y* side.

Figure 24:
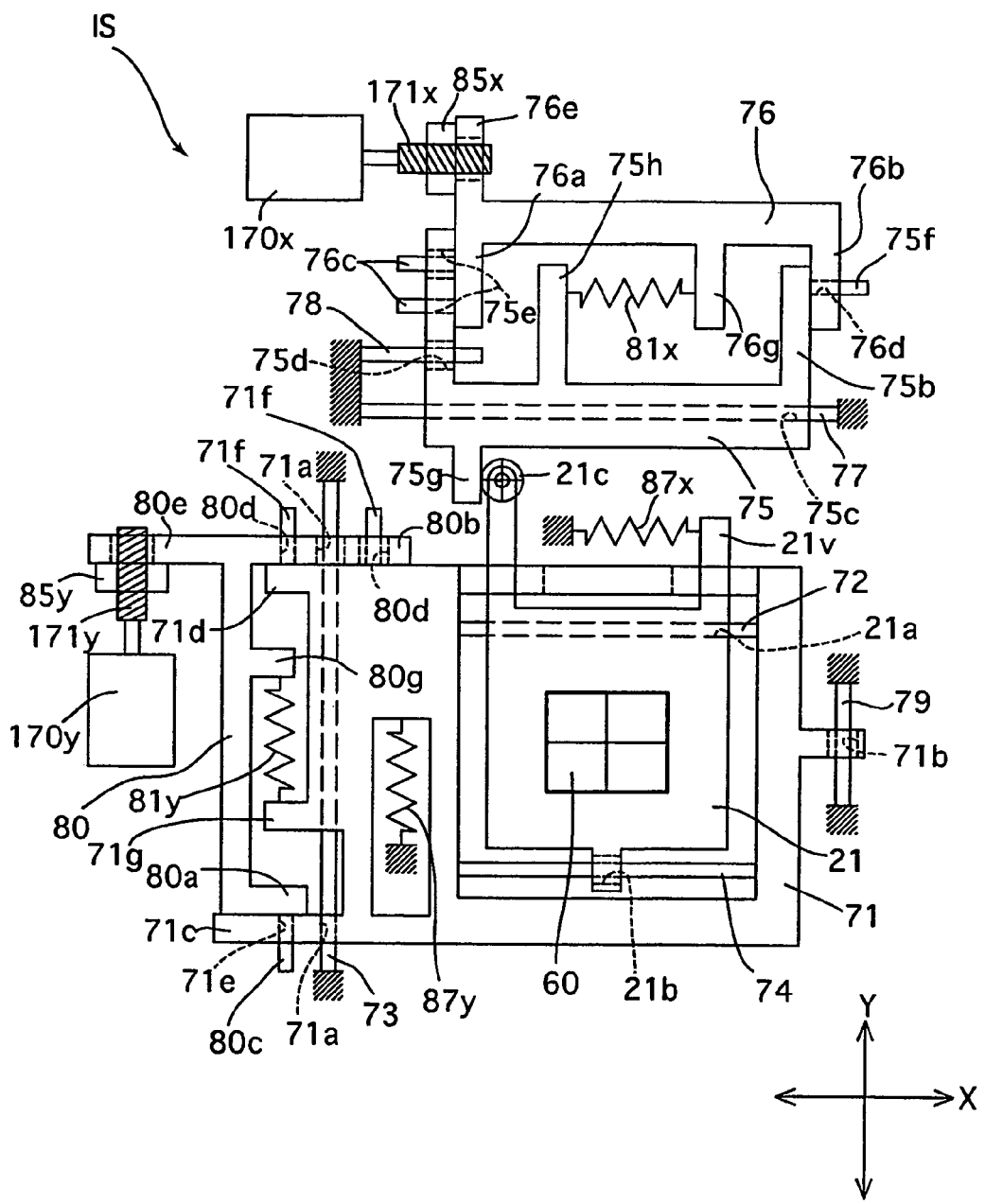
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-axis direction guide rod 78 and the pair of guide pins 76*c*, etc., are different from those shown in FIGS. 7 through 23 for the purpose of illustration. As can be understood from this schematic diagram, in the driving mechanism for driving the CCD image sensor 60 in the X-axis direction, the first X-axis direction moving member 75 and the second X-axis direction moving member 76 are coupled to each other resiliently by the biasing force of the extension joining spring 81*x* with the movement limit lug 75*a* and the movement limit lug 75*b* in contact with the movement limit lug 76*a* and the movement limit lug 76*b*, respectively. The biasing force of the X-axis direction stage biasing spring 87*x* is exerted on the first X-axis direction moving member 75 via the transfer roller 21c, which is in contact with the linkage projection 75g. Although the biasing force of the X-axis direction stage biasing spring 87x is exerted on the first X-axis direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-axis direction stage biasing spring 87x. Therefore, the first X-axis direction moving member 75 and the second X-axis direction moving member 76 are collectively biased leftward as viewed in FIG. 24 while maintaining the movement limit lugs 75a and 75b in resilient contact with the movement limit lugs 76a and 76b, respectively. Since the leftward movement of the second X-axis direction moving member 76 is limited by the engagement of the nut contacting portion 76e with the X-axis direction driven nut member 85x, the position of the X-axis direction driven nut member 85x serves as a reference position for each of the first X-axis direction moving member 75 and the second X-axis direction moving member 76 in the X-axis direction. As can be seen in FIG. 24, the end of the feed screw 171x extends through a through-hole (see FIGS. 14 and 15) formed on the nut contacting portion 76e so as not to interfere therewith.

Driving the X-axis drive motor 170x to rotate the drive shaft thereof (the feed screw 171x) causes the X-axis direction driven nut member 85x, that is screw-engaged with the feed screw 171x, to move linearly in the X-axis direction, thus causing the relative position between the first X-axis direction moving member 75 and the second X-axis direction moving member 76 in the X-axis direction to vary. For instance, if moved rightward with respect to the view shown in FIG. 24, the X-axis direction driven nut member 85x presses the nut contacting portion 76e in the same direction to thereby integrally move the first X-axis direction moving member 75 and the second X-axis direction moving member 76 rightward as viewed in FIG. 24 against the spring force of the X-axis direction stage biasing spring 87x. If the first X-axis direction moving member 75 is moved rightward with respect to the view shown in FIG. 24, the linkage projection 75g presses the transfer roller 21c in the same direction to thereby move the X-axis direction stage 21 rightward as viewed in FIG. 24. Conversely, if the X-axis direction driven nut member 85x is moved leftward as viewed in FIG. 24, the first X-axis direction moving member 75 and the second X-axis direction moving member 76 follow the X-axis direction driven nut member 85x to integrally move leftward as viewed in FIG. 24 by the biasing force of the X-axis direction stage biasing spring 87x. At this time, the X-axis direction stage 21 follows the first X-axis direction moving member 75 to move leftward as viewed in FIG. 24 by the biasing force of the X-axis direction stage biasing spring 87x. The linkage projection 75g and the transfer roller 21c are maintained in contact with each other at all times by the biasing force of the X-axis direction stage biasing spring 87x.

In the driving mechanism for driving the CCD image sensor 60 in the Y-axis direction, the Y-axis direction moving stage 71 and the Y-axis direction moving member 80 are resiliently coupled to each other via the extension joining spring 81y with the movement limit lugs 71c and 71d being in contact with the movement limit lugs 80a and 80b, respectively. Although the Y-axis direction moving stage 71 is biased downward as viewed in FIG. 24 by the spring force of the Y-axis direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-axis direction stage biasing spring 87y. Therefore, the Y-axis direction moving stage 71 and the Y-axis direction moving member 80 are collectively biased downward while maintaining the movement limit lugs 71c and 71d in resilient contact with the movement limit lugs 80a and 80b, respectively. Since the downward movement of the Y-axis direction moving member 80 is limited by the engagement of the nut contacting portion 80e with the Y-axis direction driven nut member 85y, the position of the Y-axis direction driven nut member 85y serves as a reference position for each of the Y-axis direction moving stage 71 and the Y-axis direction moving member 80 in the Y-axis direction. As can be seen in FIG. 24, the end of the feed screw 171y extends through a through-hole (see FIGS. 16 and 17) formed on the nut contacting portion 80e so as not to interfere therewith.

Driving the Y-axis drive motor 170y to rotate the drive shaft thereof (the feed screw 171y) causes the Y-axis direction driven nut member 85y, that is screw-engaged with the feed screw 171y, to move linearly in the Y-axis direction, thus causing the relative position between the Y-axis direction moving stage 71 and the Y-axis direction moving member 80 in the Y-axis direction to vary. For instance, if the Y-axis direction driven nut member 85y is moved upward as viewed in FIG. 24, the Y-axis direction driven nut member 85y presses the nut contacting portion 80e in the same direction to thereby integrally move the Y-axis direction moving stage 71 and the Y-axis direction moving member 80 upward with respect to the view shown in FIG. 24 against the spring force of the Y-axis direction stage biasing spring 87y. Conversely, if the Y-axis direction driven nut member 85y is moved downward with respect to the view shown in FIG. 24, the Y-axis direction moving stage 71 and the Y-axis direction moving member 80 follow the Y-axis direction driven nut member 85y to integrally move downward by the biasing force of the Y-axis direction stage biasing spring 87y.

When the Y-axis direction moving stage 71 moves in the Y-axis direction, the X-axis direction stage 21 that is supported by the Y-axis direction moving stage 71 thereon moves together with the Y-axis direction moving stage 71. On the other hand, when the X-axis direction stage 21 moves together with the Y-axis direction moving stage 71 vertically in the Y-axis direction, the contacting point between the transfer roller 21c and the contacting surface of the linkage projection 75g varies because the first X-axis direction moving member 75, with which the transfer roller 21c is in contact, does not move in the Y-axis direction. At this time, the transfer roller 21c rolls on the contacting surface of the linkage projection 75g, so that the X-axis direction stage 21 can be moved in the Y-axis direction without exerting any driving force in the Y-axis direction to the first X-axis direction moving member 75.

According to the above described structure of the image stabilizing unit IS, the X-axis direction stage 21 can be moved forward and reverse in the X-axis direction by driving the X-axis drive motor 170x forward and reverse, respectively; and the Y-axis direction moving stage 71, together with the X-axis direction stage 21 that is supported by the Y-axis direction moving stage 71, can be moved forward and reverse in the Y-axis direction by driving the Y-axis drive motor 170y forward and reverse, respectively.

Figure 18:
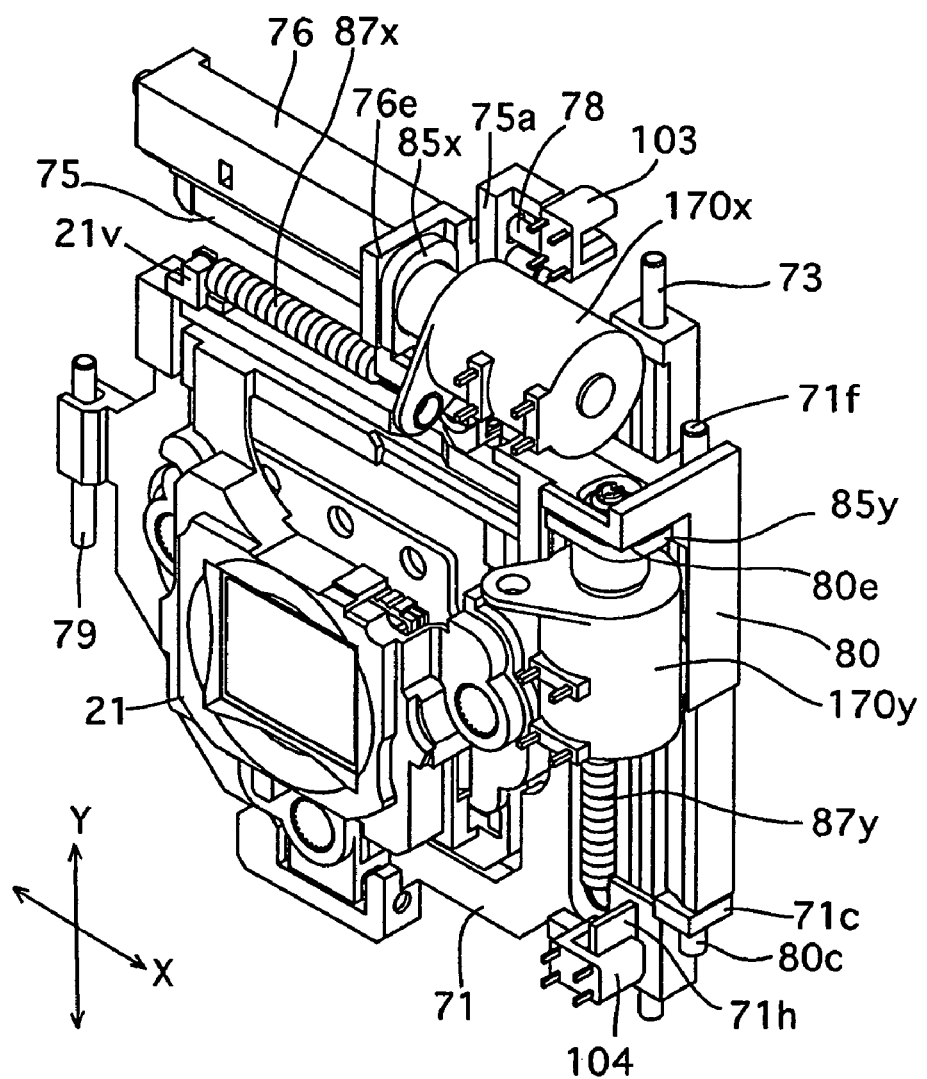
FIG. 18 is a front perspective view of the image stabilizing unit from which the stationary holder is removed.
Figure 19:
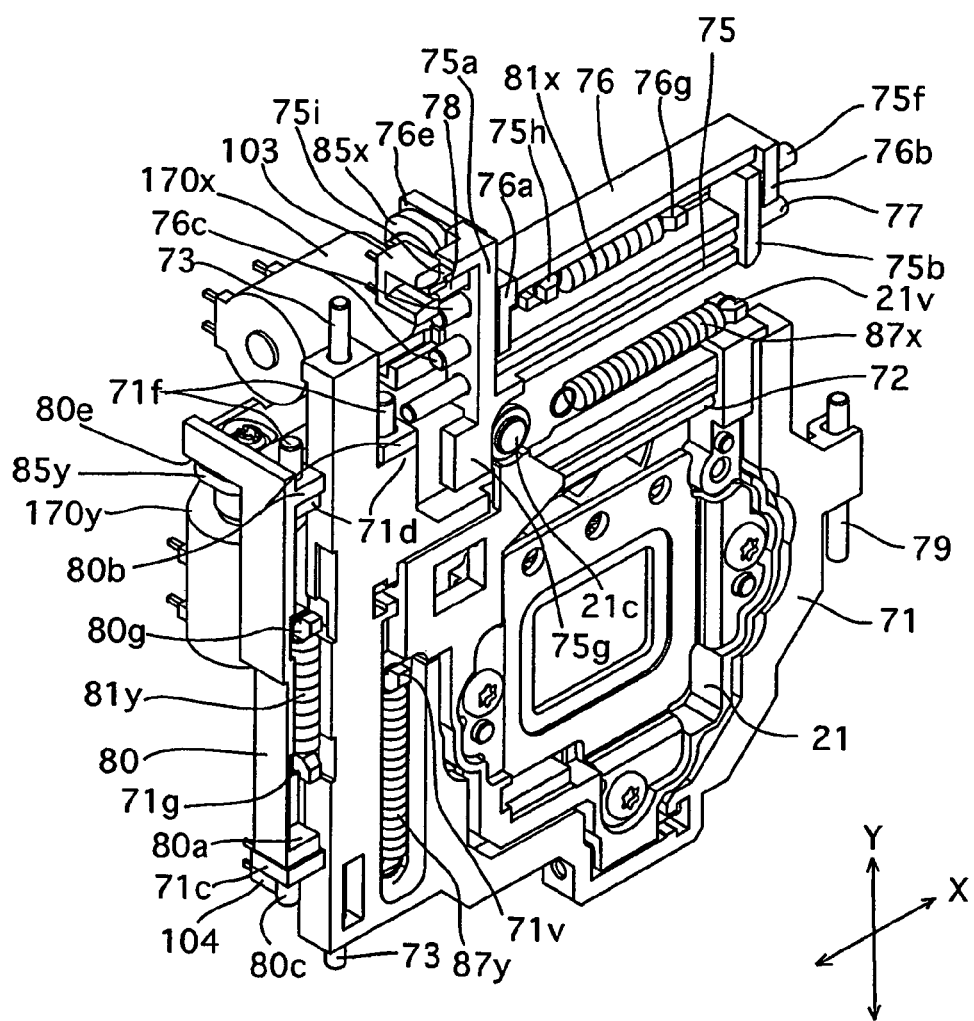
FIG. 19 is a rear perspective view of the elements of the image stabilizing unit shown in FIG. 18.
Figure 20:
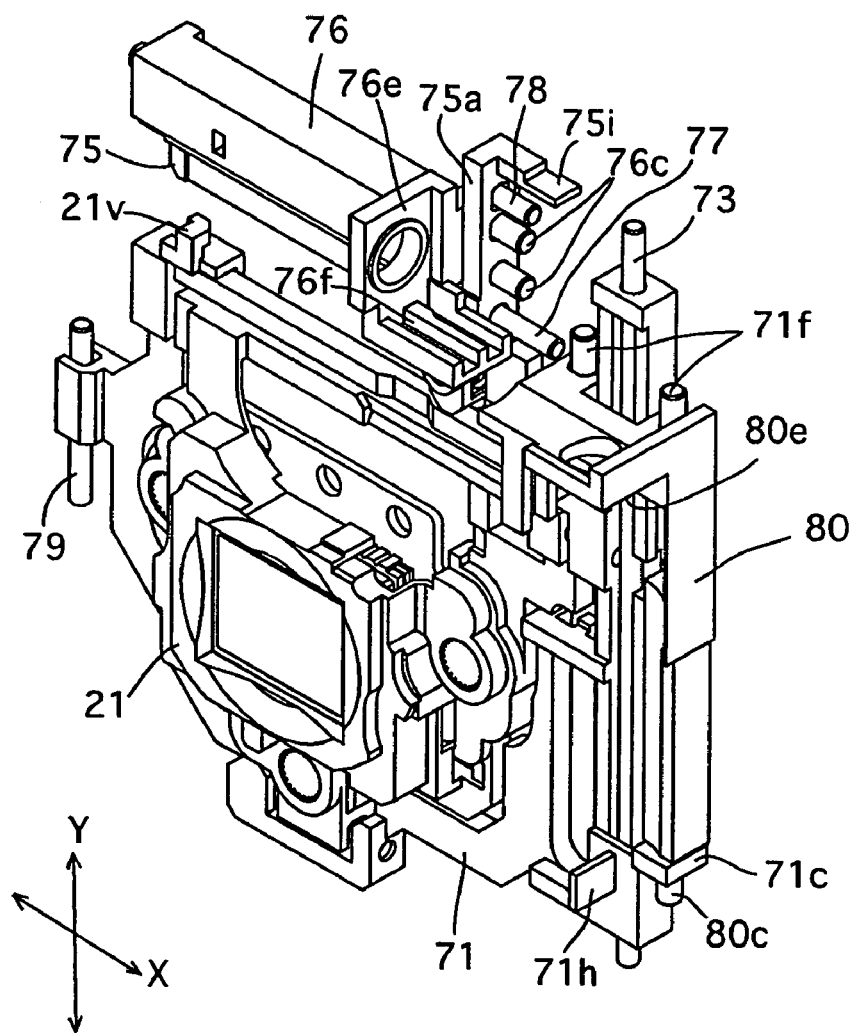
FIG. 20 is a front perspective view of the elements of the image stabilizing unit shown in FIGS. 18 and 19 from which drive motors, photo-interrupters and biasing springs are further removed.
Figure 21:
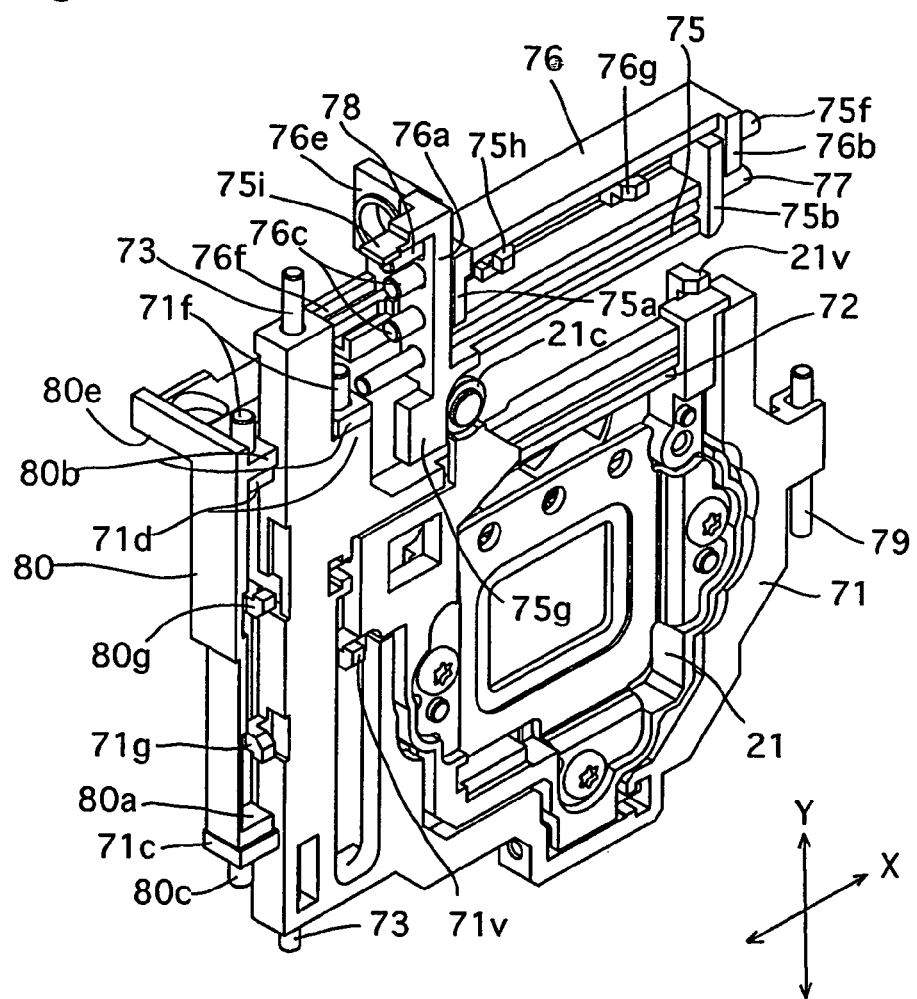
FIG. 21 is a rear perspective view of the elements of the image stabilizing unit shown in FIG. 20.
Figure 22:
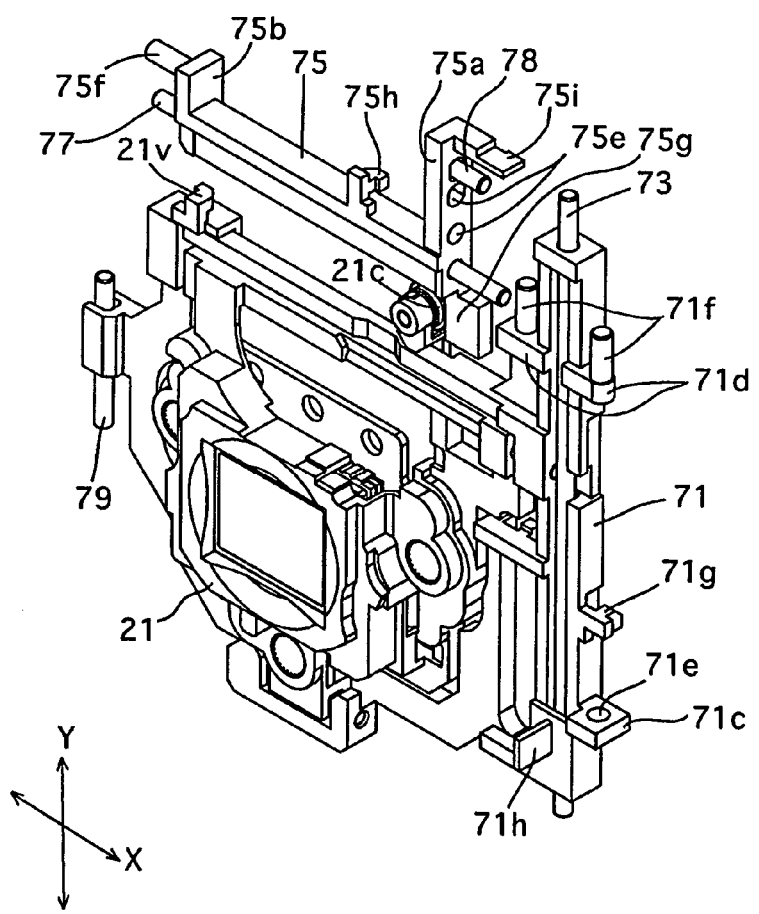
FIG. 22 is a front perspective view of the elements of the image stabilizing unit shown in FIGS. 20 and 21 from which the second X-axis direction moving member and the Y-axis direction moving member are further removed.
Figure 23:
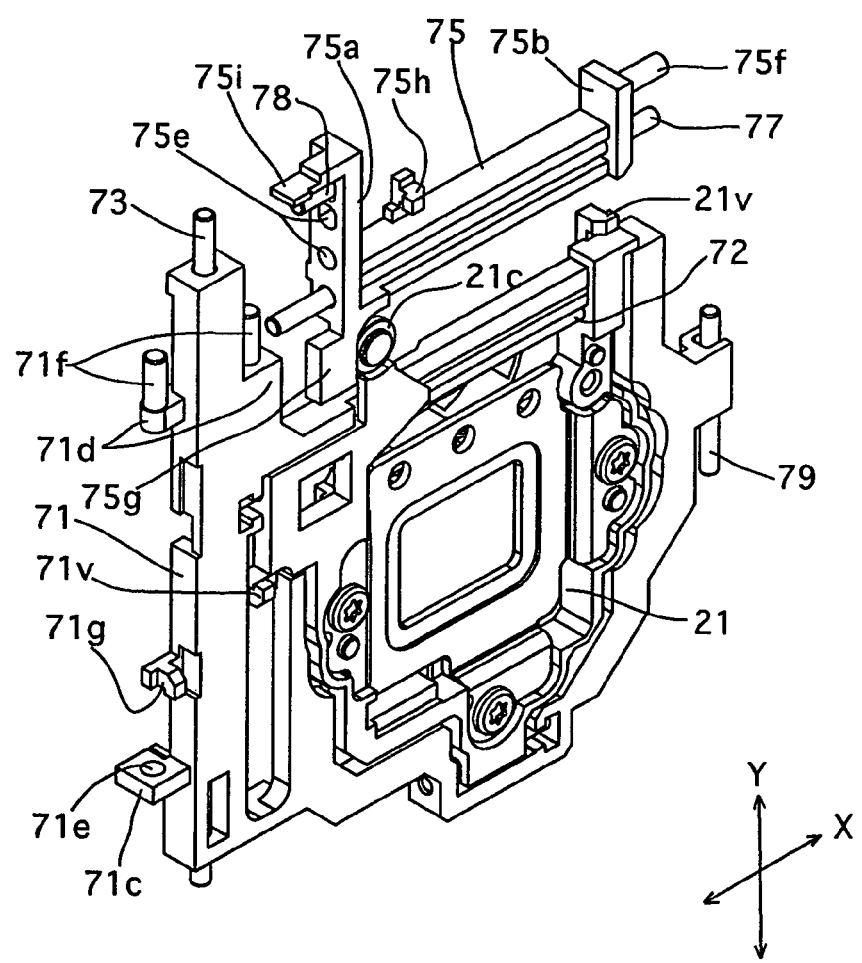
FIG. 23 is a rear perspective view of the elements of the image stabilizing unit shown in FIG. 22.

As shown in FIGS. 14 and 15, the first X-axis direction moving member 75 is provided in the vicinity of the movement limit lug 75a with a position detection lug 75i in the shape of a small thin plate. As shown in FIG. 16, the Y-axis direction moving stage 71 is provided in the vicinity of the movement limit lug 71*c* with a position detection lug 71*h* in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75*i* of the first X-axis direction moving member 75 that passes between mutually facing emitter/receiver elements when the light beam is blocked by the position detection lug 75*i*. Likewise, the second photo-interrupter 104 detects the presence of the position detection lug 71*h* of the Y-axis direction moving stage 71 that passes between mutually facing emitter/receiver elements when the light beam is blocked by the position detection lug 71*h*. The initial position of the first X-axis direction moving member 75 (the X-axis direction stage 21) in the X-axis direction can be detected by detecting the presence of the position detection lug 75*i* by the first photo-interrupter 103, while the initial position of the Y-axis direction moving stage 71 in the Y-axis direction can be detected by detecting the presence of the position detection lug 71*h* by the second photo-interrupter 104.

As shown in the block diagram in FIG. 25, the digital camera 200 is provided with an X-axis direction gyro sensor (angular velocity sensor) 105 and a Y-axis direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-axis direction and in the Y-axis direction. The control circuit 102 further calculates the driving amounts and the driving directions of the X-axis direction stage 21 (the first X-axis direction moving member 75 and the second X-axis direction moving member 76) and the Y-axis direction moving stage 71 (the Y-axis direction moving member 80) for the respective axial directions (driving pulses for the X-axis drive motor 170*x* and the Y-axis drive motor 170*y*) in order to counteract camera shake. Thereupon, the X-axis drive motor 170*x* and the Y-axis drive motor 170*y* are actuated and the operations thereof are controlled in accordance with the calculated values, which counteract image shake of an object image captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed.

Additionally, by operating the photographing mode select switch 107, either a first tracking mode or a second tracking mode can be selected in the image stabilization mode. The image stabilizing capability remains activated by driving the X-axis drive motor 170*x* and the Y-axis drive motor 170*y* in the first tracking mode, while the image stabilizing capability is activated by driving the X-axis drive motor 170*x* and the Y-axis drive motor 170*y* only when a photometric switch 108 or a release switch 109 (see FIG. 25) provided in the digital camera 200 is turned ON in the second tracking mode. The photometric switch 108 is turned ON by depressing the shutter button 205 half way, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-axis drive motor 170*x* and the Y-axis drive motor 170*y* to the CCD image sensor 60 (the X-axis direction stage 21) to prevent damage to the feed screws 171*x* and 171*y* and other associated elements. This damage-protection structure is composed of two major components: a first component composed of the first X-axis direction moving member 75 and the second X-axis direction moving member 76 (which are resiliently coupled to each other by the extension joining spring 81*x*) in the driving mechanism for driving the CCD image sensor 60 in the X-axis direction and a second part composed of the Y-axis direction stage 71 and the Y-axis direction moving member 80 (which are resiliently coupled to each other by the extension joining spring 81*y*) in the driving mechanism for driving the CCD image sensor 60 in the Y-axis direction.

The driving mechanism for driving the CCD image sensor 60 in the X-axis direction has the capability of protecting itself from damage. This capability will be discussed hereinafter.

For instance, when the X-axis direction driven nut member 85*x* is moved rightward with respect to the view shown in FIG. 24 by the X-axis drive motor 170*x*, the first X-axis direction moving member 75 and the second X-axis direction moving member 76, which move integrally in a normal state, move relative to each other in the X-axis direction so as to disengage the movement limit lug 75*a* and the movement limit lug 76*a* (and also the movement limit lug 75*b* and the movement limit lug 76*b*) from each other against the biasing force of the extension joining spring 81*x* in the event of the X-axis direction stage 21 abutting against the Y-axis direction stage 71 upon reaching a mechanical limit of movement of the X-axis direction stage 21 or other causes which interfere with movement of the X-axis direction stage 21. Specifically, the second X-axis direction moving member 76 can solely move rightward in the X-axis direction relative to the first X-axis direction moving member 75 in the case where movement of the first X-axis direction moving member 75, together with the X-axis direction stage 21, is prevented for some reason. This structure makes it possible for the X-axis direction driven nut member 85*x* to move along the feed screw 171*x* even if the X-axis direction stage 21 becomes immobilized. This prevents excessive loads on the aforementioned driving force transfer mechanism, thus preventing thread jamming between the feed screw 171*x* and the X-axis direction driven nut member 85*x* and further preventing damage to other associated parts of the driving force transfer mechanism. When the X-axis direction driven nut member 85*x* is moved leftward with respect to the view shown in FIG. 24 by the X-axis drive motor 170*x*, the X-axis direction driven nut member 85*x* moves in a direction away from the nut contacting portion 76*e*, and accordingly, the driving force of the X-axis drive motor 170*x* does not act on either the first X-axis direction moving member 75 or the second X-axis direction moving member 76; hence, no undue loads are exerted on the driving force transfer mechanism even if movement of the X-axis direction stage 21 is prevented for some reason.

Similar to the driving mechanism for driving the CCD image sensor 60 in the X-axis direction, the driving mechanism for driving the CCD image sensor 60 in the Y-axis direction also has the capability of protecting itself from damage. This capability will be discussed hereinafter.

For instance, when the Y-axis direction driven nut member 85*y* is moved upward with respect to the view shown in FIG. 24 by the Y-axis drive motor 170*y*, the Y-axis direction moving member 80 and the Y-axis direction moving stage 71, which move integrally in a normal state, move relative to each other in the Y-axis direction to disengage the movement limit lug 71c and the movement limit lug 80a (and also the movement limit lug 71d and the movement limit lug 80b) away from each other against the biasing force of the extension joining spring 81y in the event of the Y-axis direction stage 71 abutting against the stationary holder 23 upon reaching a mechanical limit of movement of the Y-axis direction stage 71 or other causes which interfere with movement of the Y-axis direction stage 71 (or the X-axis direction stage 21). Specifically, the Y-axis direction moving member 80 can solely move upward in the Y-axis direction relative to the Y-axis direction moving stage 71 in the case where movement of the Y-axis direction stage 71 is prevented for some reason. This structure makes it possible for the Y-axis direction driven nut member 85y to move along the feed screw 171y even if the Y-axis direction stage 71 becomes immobilized. This prevents excessive loads on the aforementioned driving force transfer mechanism, thus preventing thread jamming between the feed screw 171y and the Y-axis direction driven nut member 85y and further preventing damage to other associated parts of the driving force transfer mechanism. When the Y-axis direction driven nut member 85y is moved downward with respect to the view shown in FIG. 24 by the Y-axis drive motor 170y, the Y-axis direction driven nut member 85y moves in a direction away from the nut contacting portion 80e, and accordingly, the driving force of the Y-axis drive motor 170y does not act on either the Y-axis direction moving member 80 or the Y-axis direction moving stage 71; hence, no undue loads are exerted on the driving force transfer mechanism even if movement of the Y-axis direction stage 71 is prevented for some reason.

As mentioned above, the range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23. Namely, the mechanical limits of movement of the X-axis direction stage 21 in the X-axis direction are defined by inner peripheral surfaces of the Y-axis direction moving stage 71, while the mechanical limits of movement of the Y-axis direction stage 71 in the Y-axis direction are defined by inner peripheral surfaces of the stationary holder 23. It is desirable that the driving force of the X-axis drive motor 170x be stopped being transferred from the feed screw 171x to the X-axis direction driven nut member 85x upon the X-axis direction stage 21 reaching either of the right and left limits of movement thereof, and that the driving force of the Y-axis drive motor 170y be stopped being transferred from the feed screw 171y to the Y-axis direction driven nut member 85y upon the Y-axis direction stage 71 reaching either of the upper and lower limits of movement thereof. However, taking manufacturing tolerances of the associated components into consideration, such an ideal correlation cannot be always achieved. For instance, if the X-axis direction driven nut member 85x and the feed screw 171x (or the Y-axis direction driven nut member 85y and the feed screw 171y) are still screw-engaged with each other by a sufficient axial length in a state where the X-axis direction stage 21 (or the Y-axis direction stage 71) has reached a mechanical limit of movement thereof, there will be a possibility of jamming occurring between the feed screw 171x and the X-axis direction driven nut member 85x (or the feed screw 171y and the Y-axis direction driven nut member 85y) due to loads placed on each of the X-axis direction driven nut member 85x and the feed screw 171x (or the Y-axis direction driven nut member 85y and the feed screw 171y) by a further rotation of the X-axis drive motor 170x (or the Y-axis drive motor 170y) if the image stabilizer of the digital camera 200 incorporates no damage-protection structure such as the above described damage-protection structure.

To prevent this problem from occurring, the image stabilizing mechanism can be considered to be constructed so that the X-axis direction driven nut member 85x (the Y-axis direction driven nut member 85y) is disengaged from the feed screw 171x (171y) to come off upon reaching either end of the feed screw 171x (171y) after giving the X-axis direction driven nut member 85x (the Y-axis direction driven nut member 85y) a sufficient range of movement on the feed screw 171x (171y) so that the X-axis direction stage 21 (the Y-axis direction stage 71) may not reach a mechanical limit of movement thereof easily. However, according to this structure, the range of movement of each of the X-axis direction stage 21 and the Y-axis direction stage 71 is required to be increased more than necessary, which may undesirably increase the size of the whole image stabilizer. Additionally, if the X-axis direction stage 21 or the Y-axis direction stage 71 is jammed accidentally at some middle point in the range of movement thereof (i.e., not at either end of the range of movement thereof), heavy loads are put on the screw-engaged portion between the X-axis direction driven nut member 85x (or the Y-axis direction driven nut member 85y) and the feed screw 171x (or 171y), regardless of the range of movement of the X-axis direction stage 21 or the Y-axis direction stage 71.

Conversely, according to the above illustrated embodiment of the image stabilizer, a difference in amount of movement in the X-axis direction between the X-axis direction driven nut member 85x and the X-axis direction stage 21 is absorbed by intermediate members (i.e., the first X-axis direction moving member 75 and the second X-axis direction moving member 76), while a difference in amount of movement in the Y-axis direction between the Y-axis direction driven nut member 85y and the X-axis direction stage 21 is absorbed by intermediate members (i.e., the Y-axis direction stage 71 and the Y-axis direction moving member 80), and therefore, the range of movement of each of the X-axis direction stage 21 and the Y-axis direction stage 71 does not need to be increased more than necessary. Moreover, even if the X-axis direction stage 21 or the Y-axis direction stage 71 is jammed accidentally at some middle point in the range of movement thereof (i.e., not at either end of the range of movement thereof), no heavy loads are put on the screw-engaged portion between the X-axis direction driven nut member 85x (or the Y-axis direction driven nut member 85y) and the feed screw 171x (or 171y) because a difference in amount of movement in the X-axis direction between the X-axis direction driven nut member 85x and the X-axis direction stage 21 (or a difference in amount of movement in the Y-axis direction between the X-axis direction driven nut member 85y and the Y-axis direction stage 21) is absorbed by the aforementioned intermediate members (the first X-axis direction moving member 75 and the second X-axis direction moving member 76, or the Y-axis direction stage 71 and the Y-axis direction moving member 80).

In the present embodiment of the image stabilizer, the maximum amount of relative movement between the first X-axis direction moving member 75 and the second X-axis direction moving member 76 is predetermined to be capable of absorbing any difference in amount of movement between the X-axis direction driven nut member 85x and the X-axis direction stage 21 wherever each of the X-axis direction driven nut member 85x and the X-axis direction stage 21 may be positioned in the range of movement thereof. Likewise, the maximum amount of relative movement between the Y-axis direction stage 71 and the Y-axis direction moving member 80 is predetermined to be capable of absorbing any difference in amount of movement between the Y-axis direction driven nut member 85y and the Y-axis direction stage 71 wherever each of the Y-axis direction driven nut member 85y and the Y-axis direction stage 71 may be positioned in the range of movement thereof.

A restriction on movement on the X-axis direction stage 21 or the Y-axis direction stage 71 is not the only cause of imposing loads on the driving force transfer mechanism. Since the CCD image sensor 60, that serves as an optical element for counteracting image shake, is supported to be freely movable in the X-axis direction and the Y-axis direction, there is a possibility of the X-axis direction stage 21 (which holds the CCD image sensor 60) or the Y-axis direction stage 71 (which holds the X-axis direction stage 21) being subjected to a force which forces the X-axis direction stage 21 or the Y-axis direction stage 71 to move even though no driving force is applied thereto by the X-axis drive motor 170x or the Y-axis drive motor 170y, respectively, in the case where a shock or sudden impact is applied to the digital camera 200 when the digital camera 200 is, e.g., dropped to the ground. Even in such a case, such loads, shock or sudden impact can be securely absorbed in the present embodiment of the image stabilizer.

For instance, if the X-axis direction stage 21 is moved leftward with respect to the view shown in FIG. 24 by an external force other than the driving force of the X-axis drive motor 170x, the first X-axis direction moving member 75 is pressed in the same direction via the transfer roller 21c. Since this direction of pressing the first X-axis direction moving member 75 is a direction which disengages the movement limit lugs 75a and 75b from the movement limit lugs 76a and 76b, respectively, the first X-axis direction moving member 75 can solely move leftward relative to the second X-axis direction moving member 76 against the biasing force of the extension joining spring 81x. At this time, the first X-axis direction moving member 75 does not mechanically press the second X-axis direction moving member 76, so that only a resilient tensile force of the extension joining spring 81x acts on the second X-axis direction moving member 76, and accordingly, no excessive force is applied to the X-axis direction driven nut member 85x from the second X-axis direction moving member 76. If the X-axis direction stage 21 is moved rightward with respect to the view shown in FIG. 24 by an external force other than the driving force of the X-axis drive motor 170x, the X-axis direction stage 21 moves in a direction to disengage the transfer roller 21c from the linkage projection 75g, either the first X-axis direction moving member 75 or the second X-axis direction moving member 76 is subjected to the moving force of the X-axis direction stage 21. Namely, even if the X-axis direction stage 21 is forced to move forward or reverse in the X-axis direction by an external force or the like when the X-axis drive motor 170x is not in operation, no undue loads are exerted on the screw-engaged portion between the X-axis direction driven nut member 85x and the feed screw 171x.

On the other hand, if the Y-axis direction stage 71 is moved downward with respect to the view shown in FIG. 24 by an external force other than the driving force of the Y-axis drive motor 170y, this moving direction of the Y-axis direction stage 71 is a direction which disengages the movement limit lugs 80a and 80b from the movement limit lugs 71c and 71d, respectively, and accordingly, the Y-axis direction stage 71 can solely move downward relative to the Y-axis direction moving member 80 against the biasing force of the extension joining spring 81y. At this time, the Y-axis direction stage 71 does not mechanically press the Y-axis direction moving member 80, so that only a resilient tensile force of the extension joining spring 81y acts on the Y-axis direction moving member 80, and accordingly, no excessive force is applied to the Y-axis direction driven nut member 85y from the Y-axis direction moving member 80. If the X-axis direction stage 21 is moved upward with respect to the view shown in FIG. 24 by an external force other than the driving force of the X-axis drive motor 170x, the Y-axis direction moving member 80 is pressed upward via the engagement between the movement limit lug 80a and the movement limit lug 71c and the engagement between the movement limit lug 80b and the movement limit lug 71d. At this time, the moving force of the Y-axis direction moving member 80 does not act on the Y-axis direction driven nut member 85y because this direction of movement of the Y-axis direction moving member 80 is a direction to disengage the nut contacting portion 80e from the Y-axis direction driven nut member 85y. Namely, even if the Y-axis direction stage 71 is forced to move forward or reverse in the Y-axis direction by an external force or the like when the Y-axis drive motor 170y is not in operation, no undue loads are exerted on the screw-engaged portion between the X-axis direction driven nut member 85y and the feed screw 171y.

As can be understood from the above description, according to the above illustrated embodiment of the image stabilizer, in either of the following two cases, i.e., the case where a malfunction occurs in the moving operation of the X-axis direction stage 21 and/or the Y-axis direction stage 71 when it is driven by the X-axis drive motor 170x or the Y-axis drive motor 170y; and the case where the X-axis direction stage 21 and/or the Y-axis direction stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are put on either of the two screw-engaged portions between the X-axis direction driven nut member 85x and the feed screw 171x and between the Y-axis direction driven nut member 85y and the feed screw 171y, which produces a high degree of effectiveness of preventing each of these two screw-engaged portions from being damaged. Although it is possible to drive the X-axis direction stage 21 and the Y-axis direction stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 26:
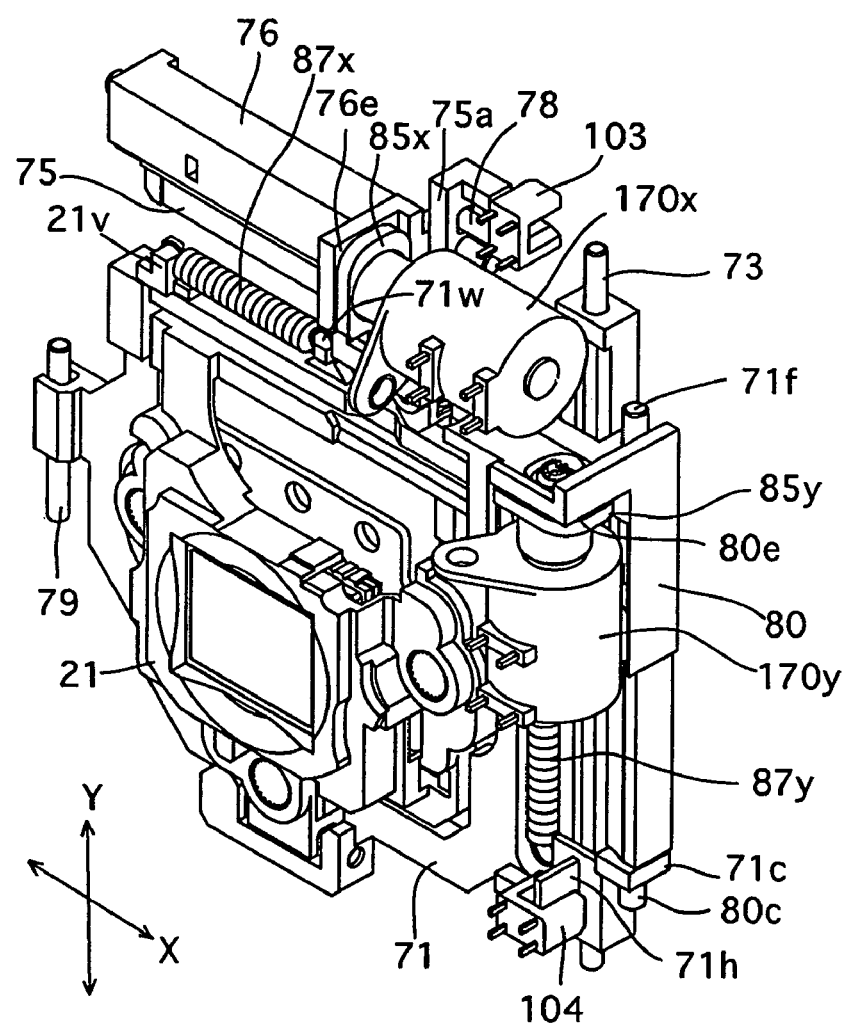
FIG. 26 is a view similar to that of FIG. 18, showing another embodiment (second embodiment) of the image stabilizing unit from which the stationary holder is removed.
Figure 27:
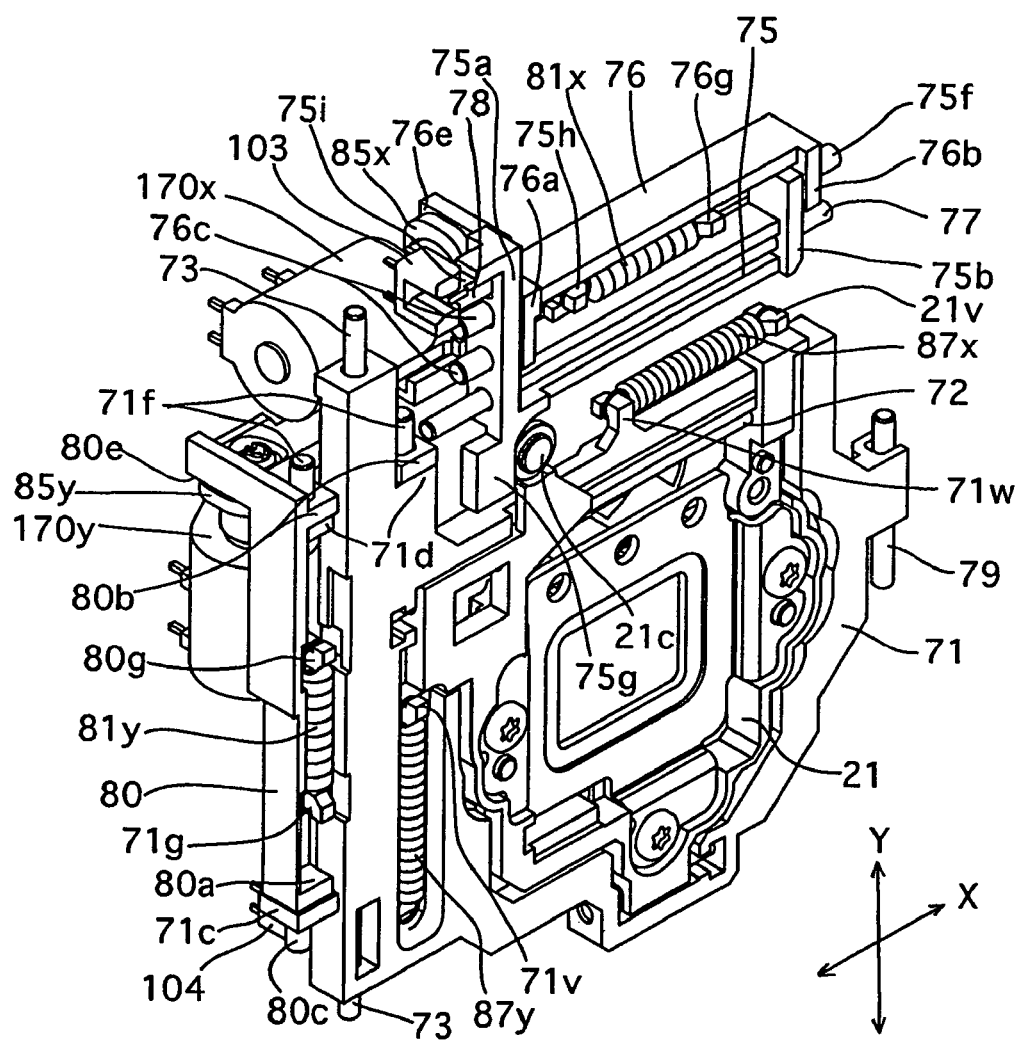
FIG. 27 is a rear perspective view of the elements of the image stabilizing unit shown in FIG. 26.
Figure 28:
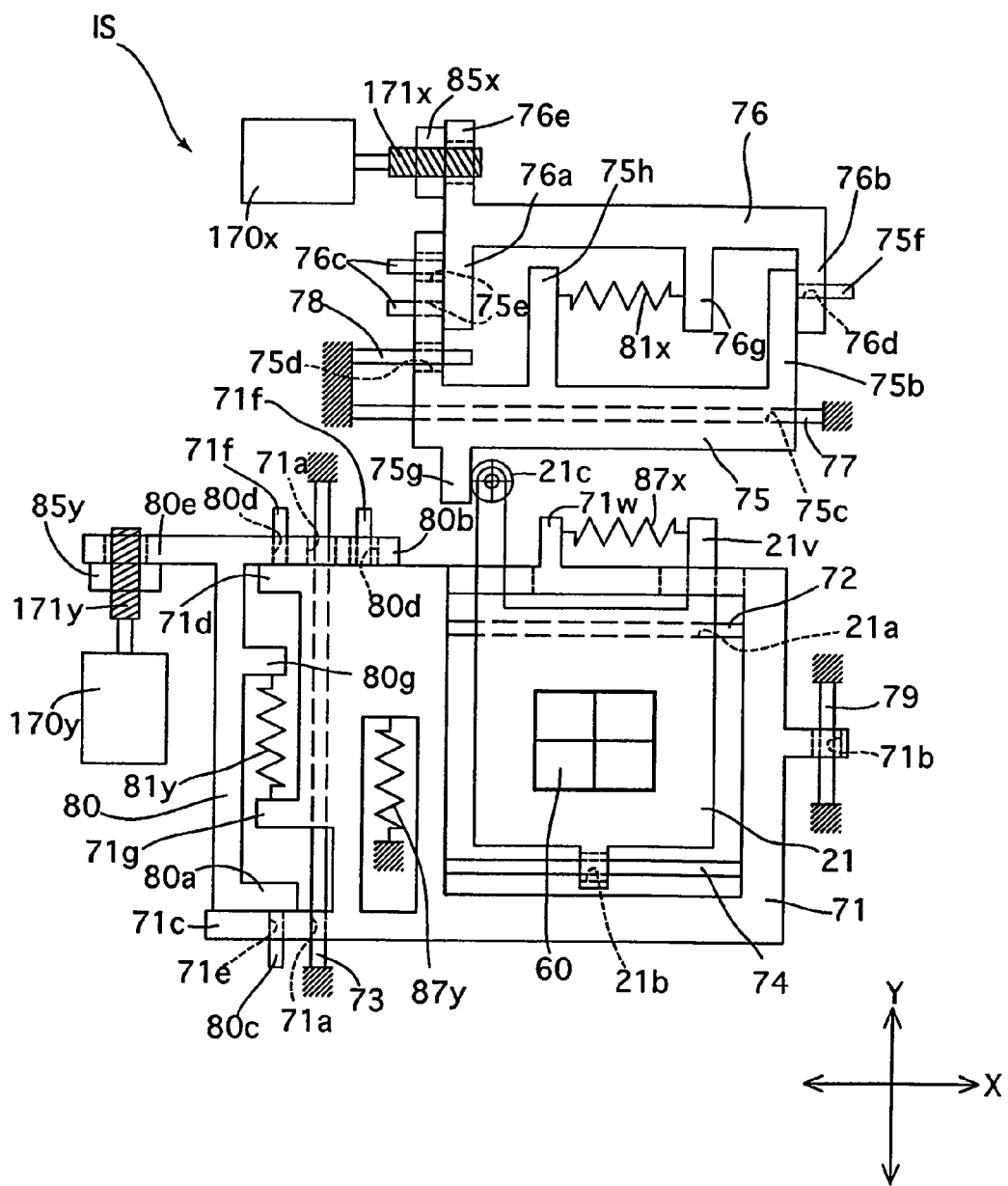
FIG. 28 is a diagrammatic illustration of the second embodiment of the image stabilizing unit, showing the structure thereof.

FIGS. 26 through 28 show another embodiment (second embodiment) of the image stabilizing unit IS. In this embodiment, the elements corresponding to those in the previous embodiment (first embodiment) of the image stabilizer IS are designated with like reference numerals. The second embodiment of the image stabilizing unit is the same as the first embodiment of the image stabilizing unit except that one end (left end as viewed in FIG. 28) of the X-axis direction stage biasing spring 87x is hooked on the Y-axis direction stage 71, not on the stationary holder 23. More specifically, the X-axis direction stage biasing spring 87x is extended and installed between a spring hook 71w formed on the Y-axis direction stage 71 and the spring hook 21v of the X-axis direction stage 21. The same effect as that of the first embodiment of the image stabilizing unit can be obtained in the second embodiment of the image stabilizing unit.

As described in the above illustrated embodiments of the image stabilizing unit (image stabilizer) IS, the Y-axis direction moving stage first moving stage) 71 is supported by the stationary holder (stationary member) 23 thereon to be freely movable linearly in the Y-axis direction (first direction) in a plane orthogonal to the photographing optical axis Z1, the X-axis direction moving stage (second moving stage) 21 is supported by the Y-axis direction moving stage 71 thereon to be freely movable linearly in the X-axis direction (second direction; which is orthogonal to the Y-axis direction) in the aforementioned plane orthogonal to the photographing optical axis Z1, and the CCD image sensor (image-stabilizing optical element) 60 is mounted on the X-axis moving stage 21. Additionally, both the X-axis drive motor (second driving device) 170x, which serves as a drive source for driving the CCD image sensor 60 forward and reverse in the X-axis direction, and the Y-axis drive motor (first driving device) 170y, which serves as a drive source for driving the CCD image sensor 60 forward and reverse in the Y-axis direction, are mounted on the stationary holder 23.

The Y-axis direction driven nut member (intermediate moving element/first drive nut) 85y and the Y-axis direction moving member (intermediate moving element) 80 are directly linked with each other by a direct mechanical linkage portion which is composed of the movement limit lugs (contacting surfaces/first contacting surfaces) 80a and 80b, the movement limit lugs (contacting surfaces/second contacting surfaces) 71c and 71d and the extension joining spring (intermediate moving element biasing spring) 81y, which biases the Y-axis direction moving stage 71 and the Y-axis direction moving member 80 in opposite directions to bring the movement limit lug 80a and the movement limit lug 71c into contact with each other and to bring the movement limit lug 80b and the movement limit lug 71d into contact with each other. Constructing the direct mechanical linkage portion from the two sets of movement limit lugs (contacting surfaces) 71c, 71d, 80a and 80b and the extension joining spring (Y-axis direction biasing spring/intermediate moving element biasing spring) 81y in such a manner makes it possible to achieve an escape (absorber/relief) for relieving mechanical strain upon an excessive load being applied to the Y-axis direction moving stage 71. However, it is possible to modify the above-described embodiment so that the Y-axis direction driven nut member 85y, the Y-axis direction moving member 80 and the Y-axis direction moving stage 71 are formed as one integral member with such a direct mechanical linkage portion being omitted.

The X-axis direction driven nut member (moving element/second drive nut) 85x, the second X-axis direction moving member (moving element) 76 and the first X-axis direction moving member (moving element) 75 are associatively linked to the X-axis direction moving stage 21 in a manner to be allowed to move in the Y-axis direction relative to the X-axis direction moving stage 21 through a linkage portion (X-axis direction linkage portion) which is composed of the linkage projection (transfer surface/first contacting portion) 75g and the transfer roller (movable contact member/second contacting portion) 21c which contact with each other by a biasing force of the X-axis direction stage biasing spring (biasing member/X-axis direction biasing spring) 87x. Constructing the X-axis direction linkage portion from a Y-axis direction surface (transfer surface/linkage projection 75g) and the moving member (transfer roller 21c) which are resiliently connected via the X-axis direction stage biasing spring (X-axis direction biasing spring/biasing member) 87x in such a manner makes it possible to drive the X-axis direction moving stage 21 smoothly in the X-axis direction by the X-axis direction driving device (the X-axis drive motor 170x), which is supported by a stationary member (the stationary holder 23) thereon. The first X-axis direction moving member 75, the second X-axis direction moving member 76, the X-axis direction linkage portion, and the extension joining spring 81x are components of an X-axis direction moving device.

Note that, alternative to the above illustrated embodiments, the X-axis direction driven nut member 85x, the second X-axis direction moving member 76 and the first X-axis direction moving member 75 can be formed as one integral member. Furthermore, instead of providing the image stabilizing unit IS with the linkage projection 75g, the transfer roller 21c and the X-axis direction moving stage biasing sprig 87x, which serve as the Y-axis direction surface (transfer surface), the moving member and the X-axis direction biasing spring (biasing member), respectively, it is possible to provide the image stabilizing unit IS with an engaging hole elongated in the first direction (the Y-axis direction) and to make a roller or the like which is supported by the X-axis direction moving stage 21 engaged in the elongated engaging hole to be freely movable in the direction of elongation of the elongated engaging hole. The transfer roller 21c can be provided as a fixed member made of a low-friction material.

Alternative to the above illustrated embodiments of the image stabilizing unit IS, each of the extension joining springs 81x and 81y, the X-axis direction stage biasing spring 87x and the Y-axis direction stage biasing spring 87y can be made as a compression spring instead of an extension spring by modifying the configurations and shapes of the associated elements.

Although the X-axis direction driving device (second driving device) and the Y-axis direction driving device (first driving device) respectively include the feed screw (second feed screw) 171x and the feed screw (first feed screw) 171y, that are rotated forward and reverse, and the moving element movable in the X-axis direction and the moving element movable in the Y-axis direction are respectively composed of the X-axis direction driven nut member 85x and the Y-axis direction driven nut member 85y that are screw-engaged with the feed screws 171x and 171y in the above illustrated embodiments of the image stabilizing unit IS, any other alternative actuators (driving devices) can be used.

In the above illustrated embodiments of the image stabilizing unit IS, the Y-axis moving stage 71 is guided in the Y-axis direction by the pair of Y-axis direction guide rods (first guide members) 73 and 79 that are provided on the stationary holder 23 to be freely slidable on the pair of Y-axis direction guide rods 73 and 79, while the linkage projection 75g and the transfer roller 21c that are elements of the X-axis direction linkage portion are positioned between the Y-axis direction guide rod 73 and an imaginary straight-line segment which extends in the Y-axis direction and passes through the CCD image sensor (image-stabilizing optical element) 60. According to this configuration, the parallelism between the Y-axis direction guide rod 73 and the X-axis direction linkage portion (75g, 21c) can be easily maintained. Moreover, a secure linkage between the first X-axis direction moving member 75 (and 76 and 85x) and the X-axis direction moving stage 21 can be achieved. The pair of Y-axis direction guide rods (first guide members) 73 and 79 and the X-axis direction linkage portion can prevent interference with the motion (e.g., mechanical distortion) of the image-stabilizing optical element (the CCD image sensor 60) if at least a part of the pair of Y-axis direction guide rods 73 and 79 and at least a part of the X-axis direction linkage portion are positioned in a common plane orthogonal to the photographing optical axis Z1

(more desirably, if the pair of Y-axis direction guide rods 73 and 79 and the X-axis direction linkage portion are precisely positioned in a common plane orthogonal to the photographing optical axis Z1).

In the above illustrated embodiments of the image stabilizing unit IS, the X-axis direction moving stage 21 is guided in the X-axis direction by the pair of X-axis direction guide rods (second guide members/x-axis direction guide device) 72 and 74, provided on the Y-axis direction moving stage 71, to be freely slidable on the pair of X-axis direction guide rods 72 and 74, while the linkage projection 75g, the transfer roller 21c and the X-axis direction stage biasing spring 87x are positioned on one side of the pair of X-axis direction guide rods 72 and 74 (i.e., above the pair of X-axis direction guide rods 72 and 74 in the drawings).

According to this configuration, the spring force of the X-axis direction stage biasing spring 87x can be reliably applied to the X-axis direction linkage portion (75g and 21c) to ensure that the linkage projection 75g and the transfer roller 21c contact each other. The pair of X-axis direction guide rods (second guide members/X-axis direction guide device) 72 and 74, the X-axis direction linkage portion (75g and 21c) and the X-axis direction stage biasing spring (biasing member/X-axis direction biasing spring) 87x can prevent interference with the motion (e.g., mechanical distortion) of the image-stabilizing optical element (the CCD image sensor 60) if at least a part of the pair of X-axis direction guide rods 72 and 74, at least a part of the X-axis direction linkage portion (75g and 21c) and at least a part of the X-axis direction stage biasing spring 87x are positioned in a common plane orthogonal to the photographing optical axis Z1 (more desirably, if the pair of X-axis direction guide rods 72 and 74, the X-axis direction linkage portion and the X-axis direction stage biasing spring 87x are precisely positioned in a common plane orthogonal to the photographing optical axis Z1). Moreover, it is desirable that the pair of Y-axis direction guide rods (first guide members) 73 and 79, the X-axis direction linkage portion (75g and 21c), the pair of X-axis direction guide rods (second guide members/x-axis direction guide device) 72 and 74, and the X-axis direction biasing spring (biasing member) 87x are all positioned in a common plane orthogonal to the photographing optical axis Z1.

In regard to the support structure for supporting the X-axis direction moving stage, the X-axis direction moving stage 21 is supported by the Y-axis direction moving stage 71 thereon to be freely movable in the X-axis direction by the pair of X-direction guide rods (guide device) 72 and 74, and is biased in a direction to make the transfer roller 21c and the transfer surface of the linkage projection 75g remain in contact with each other by the biasing force of the X-axis direction stage biasing spring 87x. Moreover, the guide device (72), the X-axis direction linkage portion (75g and 21c) and the biasing member (87x) lie in a common plane orthogonal to the photographing optical axis Z1. Therefore, undesirable moments of force such as bending and torsion which may be caused by movements of the X-axis direction moving stage 21 in the X-axis direction do not act on the Y-axis direction moving stage. To prevent movements of the X-axis direction moving stage 21 from exerting an influence upon the Y-axis direction moving stage 71, the arrangement shown in FIGS. 8 and 9 in which one end (the left end as viewed in FIGS. 8 and 9) of the X-axis direction stage biasing spring 87x is hooked on the spring hook 23vx of the stationary holder 23 is more desirable than the arrangement shown in FIGS. 18, 24 and 26 through 28 in which the same end of the X-axis direction stage biasing spring 87x is hooked on the spring hook 21v of the X-axis direction moving stage 21.

Although the present invention has been described based on the above illustrated embodiments, the present invention is not limited solely to these particular embodiments. For instance, although each of the above described embodiments of the image stabilizing unit IS according to the present invention is an optical image stabilizer incorporated in a digital camera, the present invention can also be applied to an optical image stabilizer incorporated in any other type of optical equipment such as binoculars.

Although the CCD image sensor 60 is supported to be movable linearly in two axial directions (the X-axis direction and the Y-axis direction) in the above illustrated embodiments of the image stabilizing units, a manner (driving directions) of driving the image-stabilizing optical element is not limited solely to this particular driving manner. For instance, the present invention can also be applied to another type of optical image stabilizer which moves the image-stabilizing optical element only in one of the X-axis direction and the Y-axis direction to counteract image shake.

Although the X-axis direction and the Y-axis direction correspond to the horizontal direction and the vertical direction in the above illustrated embodiment of the digital camera, respectively, moving directions of the X-axis direction moving stage and the Y-axis direction moving stage are not limited solely to these particular directions. For instance, the member referred as "X-axis direction moving stage (second moving stage)" and the member referred as "Y-axis direction moving stage (first moving stage)" in the claims can be driven in the vertical direction and the horizontal direction, respectively. Alternatively, the member referred as "X-axis direction moving stage (second moving stage)" and the member referred as "Y-axis direction moving stage (first moving stage)" in the claims can be driven in two oblique directions, respectively, in a plane orthogonal to the photographing optical axis other than the horizontal and vertical directions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image stabilizer comprising:
a first moving stage supported by a stationary member to be freely movable in a first direction in a plane orthogonal to an optical axis;
a second moving stage which holds an image-stabilizing optical element and is supported by said first moving stage to be freely movable in a second direction in said plane orthogonal to said optical axis, said second direction being substantially orthogonal to said first direction;
a first driving device which is supported by said stationary member and drives said first moving stage forward and reverse in said first direction; and
a second driving device which is supported by said stationary member and drives said second moving stage forward and reverse in said second direction;
wherein said second driving device includes a moving element which is moved in said second direction, and a linkage portion which associatively links said second moving stage and said moving element to each other in a manner to allow said second moving stage and said moving element to move relative to each other in said first direction;
wherein said linkage portion includes a transfer surface provided on one of said moving element and said second moving stage to extend in said first direction, and a movable contact member which is in contact with said transfer surface to be capable of moving thereon;
wherein said linkage portion transmits the second direction movement of the moving element to the second moving stage regardless of a position of the second moving stage in the second moving direction;

wherein said movable contact member comprises a roller which is supported in a manner to roll on said transfer surface when said second moving stage and said moving element move relative to each other in said first direction; and wherein said transfer surface and said movable contact member remain in contact with each other by a biasing force of a spring.

2. The image stabilizer according to claim 1, wherein said spring is installed between said second moving stage and said first moving stage.

3. The image stabilizer according to claim 2, wherein said spring comprises an extension spring which is extended so as to be installed between said second moving stage and said first moving stage.

4. The image stabilizer according to claim 1, wherein said spring is installed between said second moving stage and said stationary member.

5. The image stabilizer according to claim 4, wherein said spring comprises an extension spring which is extended so as to be installed between said second moving stage and said stationary member.

6. The image stabilizer according to claim 1, further comprising at least one intermediate moving element which is driven by said first driving device to transfer a driving force of said first driving device to said first moving stage, wherein said intermediate moving element and said first moving stage include at least one first contacting surface and at least one second contacting surface, respectively, each of which extends in said second direction and which are made to be in contact with each other by an intermediate moving element biasing spring, said first contacting surface and said second contacting surface being capable of being disengaged from each other against a biasing force of said intermediate moving element biasing spring.

7. The image stabilizer according to claim 6, wherein said intermediate moving element biasing spring comprises an extension spring.

8. The image stabilizer according to claim 1, wherein said first driving device comprises a first feed screw and a first drive nut which is screw-engaged with said first feed screw to be prevented from rotating, and wherein a driving force of said first driving device is transferred to said first moving stage via said first drive nut.

9. The image stabilizer according to claim 1, wherein said second driving device comprises a second feed screw and a second drive nut which is screw-engaged with said second feed screw to be prevented from rotating, and wherein a driving force of said second driving device is transferred to said second moving stage via said second drive nut.

10. The image stabilizer according to claim 1, wherein said first moving stage is guided in said first direction by a pair of first guide members to be freely slidable thereon, said pair of first guide members being mounted to said stationary member, and wherein said linkage portion is positioned between one of said pair of first guide members and an imaginary straight-line segment which extends in said first direction and passes through said image-stabilizing optical element.

11. The image stabilizer according to claim 10, wherein at least a part of said pair of first guide members and at least a part of said linkage portion are positioned in a common plane orthogonal to said optical axis.

12. The image stabilizer according to claim 10, wherein said pair of first guide members comprises a pair of parallel guide shafts.

13. The image stabilizer according to claim 1, wherein said second moving stage is guided in said second direction by a pair of second guide members to be freely slidable thereon, said pair of second guide members being mounted to said first moving stage, and wherein said linkage portion and said spring are positioned on one common side of said pair of second guide members.

14. The image stabilizer according to claim 13, wherein said pair of second guide members comprises a pair of parallel guide shafts.

15. The image stabilizer according to claim 13, wherein at least a part of said pair of second guide members, at least a part of said linkage portion and at least a part of said spring are positioned in a common plane orthogonal to said optical axis.

16. The image stabilizer according to claim 1, wherein each of said first driving device and said second driving device comprises a motor.

17. The image stabilizer according to claim 1, wherein said image stabilizer is incorporated in an imaging device, said image-stabilizing optical element comprising an image pickup device.

18. An image stabilizer comprising:

an X-axis direction moving stage on which an image-stabilizing optical element is mounted;

a Y-axis direction moving stage which is supported to be freely movable in a Y-axis direction in said plane orthogonal to said optical axis, said Y-axis direction being orthogonal to said X-axis direction, said X-axis direction moving stage being supported by said Y-axis direction moving stage to be freely movable in said X-axis direction;

an X-axis direction guide device which supports said X-axis direction moving stage in a manner to allow said X-axis direction moving stage to freely move linearly in an X-axis direction in a plane orthogonal to an optical axis;

an X-axis direction moving device having a first contacting portion contactable with a second contacting portion provided on said X-axis direction moving stage; and a biasing member which biases said X-axis direction moving stage in a direction to make said first contacting portion and said second contacting portion remain in contact with each other, wherein said X-axis direction guide device, said first contacting portion, said second contacting portion and said biasing member lie in a common plane.

19. The image stabilizer according to claim 18, wherein said first contacting portion and said second contacting portion move relative to each other when said Y-axis direction moving stage moves in said Y-axis direction.

20. The image stabilizer according to claim 18, wherein said biasing device comprises a coil spring, wherein one and the other ends of said coil spring are connected to said X-axis direction moving stage and a stationary member, respectively.

21. The image stabilizer according to claim 18, wherein said biasing device comprises a coil spring, wherein one and the other ends of said coil spring are connected to said X-axis direction moving stage and said Y-axis direction moving stage, respectively.

22. The image stabilizer according to claim 18, wherein one and the other of said first contacting portion and said second contacting portion comprise a transfer surface and a roller, respectively,
- wherein said transfer surface is formed as a flat surface extending in said Y-axis direction and is orthogonal to said X-axis direction, and
- wherein said roller is supported in a manner to roll on said transfer surface when said roller moves relative to said transfer surface thereon.

23. The image stabilizer according to claim 18, wherein said biasing member comprises an extension spring.

24. The image stabilizer according to claim 18, wherein said X-axis direction guide device comprises a pair of parallel guide shafts.

25. The image stabilizer according to claim 18, wherein said image stabilizer is incorporated in an imaging device, said image-stabilizing optical element comprising an image pickup device.

* * * * *